United States Patent
Imamura

(10) Patent No.: US 8,836,825 B2
(45) Date of Patent: Sep. 16, 2014

(54) IMAGING APPARATUS

(75) Inventor: Norihiro Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 37 days.

(21) Appl. No.: 13/700,184

(22) PCT Filed: Jan. 31, 2012

(86) PCT No.: PCT/JP2012/000621
§ 371 (c)(1),
(2), (4) Date: Nov. 27, 2012

(87) PCT Pub. No.: WO2012/176355
PCT Pub. Date: Dec. 27, 2012

(65) Prior Publication Data
US 2013/0215299 A1  Aug. 22, 2013

(30) Foreign Application Priority Data
Jun. 23, 2011  (JP) .................. 2011-139502

(51) Int. Cl.
*H04N 5/217* (2011.01)
*H04N 9/07* (2006.01)
*H04N 9/04* (2006.01)

(52) U.S. Cl.
CPC .......... *H04N 9/045* (2013.01); *H04N 2209/045* (2013.01)
USPC ............................ 348/241; 348/267; 348/336

(58) Field of Classification Search
USPC ......... 348/241, 242, 266, 267, 335, 336, 353, 348/365
See application file for complete search history.

(56) References Cited

U.S. PATENT DOCUMENTS

| | | | |
|---|---|---|---|
| 7,242,478 B1 | 7/2007 | Dombrowski et al. | |
| 7,433,042 B1 | 10/2008 | Cavanaugh et al. | |
| 7,920,172 B2 * | 4/2011 | Chanas et al. ............. | 348/222.1 |
| 8,520,125 B2 * | 8/2013 | Imamura ...................... | 348/336 |
| 2004/0125230 A1 | 7/2004 | Suda | |
| 2004/0150732 A1 | 8/2004 | Yamanaka | |
| 2005/0099524 A1 | 5/2005 | Mogamiya et al. | |
| 2008/0239088 A1 | 10/2008 | Yamashita | |
| 2009/0027542 A1 | 1/2009 | Yamamoto et al. | |

(Continued)

FOREIGN PATENT DOCUMENTS

| | | |
|---|---|---|
| CN | 101540919 A | 9/2009 |
| EP | 2 101 295 A | 9/2009 |

(Continued)

OTHER PUBLICATIONS

International Search Report for corresponding International Application No. PCT/JP2012/000621 mailed May 15, 2012.

(Continued)

*Primary Examiner* — Daniel M Pasiewicz
(74) *Attorney, Agent, or Firm* — Renner, Otto, Boisselle & Sklar, LLP

(57) ABSTRACT

An imaging apparatus according to the present invention includes: a lens optical system L having a first optical region D1 and a second optical region D2 having a different optical power from that of the first optical region D1; an imaging device N having a plurality of pixels P1, P2; and an array optical device K for causing light passing through the first optical region D1 to enter the pixel P1 and causing light passing through the second optical region D2 to enter the pixel P2.

18 Claims, 24 Drawing Sheets

(56) References Cited

U.S. PATENT DOCUMENTS

| | | | |
|---|---|---|---|
| 2009/0238455 A1 | 9/2009 | Kasahara | |
| 2010/0066854 A1 | 3/2010 | Mather et al. | |
| 2010/0283863 A1 | 11/2010 | Yamamoto | |
| 2010/0283884 A1 | 11/2010 | Hayasaka et al. | |
| 2011/0073752 A1 | 3/2011 | Berkner et al. | |
| 2011/0286634 A1 | 11/2011 | Imamura | |
| 2011/0310280 A1* | 12/2011 | Goto | 348/302 |
| 2011/0316983 A1* | 12/2011 | Hiramoto et al. | 348/49 |
| 2012/0127360 A1* | 5/2012 | Devaux et al. | 348/349 |
| 2012/0182438 A1 | 7/2012 | Berkner et al. | |
| 2013/0120564 A1* | 5/2013 | Imamura | 348/135 |
| 2013/0141634 A1* | 6/2013 | Korenaga et al. | 348/360 |
| 2013/0222676 A1 | 8/2013 | Ono | |
| 2013/0235256 A1 | 9/2013 | Kodama | |
| 2013/0293704 A1* | 11/2013 | Imamura et al. | 348/135 |

FOREIGN PATENT DOCUMENTS

| | | |
|---|---|---|
| EP | 2 336 816 A2 | 6/2011 |
| JP | 04-042207 A | 2/1992 |
| JP | 2000-152281 A | 5/2000 |
| JP | 2001-174696 A | 6/2001 |
| JP | 2003-523646 T | 8/2003 |
| JP | 2004-191893 A | 7/2004 |
| JP | 2006-184065 A | 7/2006 |
| JP | 2006-184844 A | 7/2006 |
| JP | 2007-017401 A | 1/2007 |
| JP | 2008-532449 T | 8/2008 |
| WO | 00/50927 A2 | 8/2000 |
| WO | 2006/095110 A2 | 9/2006 |
| WO | 2011/052172 A1 | 5/2011 |
| WO | 2012/017577 A1 | 2/2012 |

OTHER PUBLICATIONS

Form PCT/ISA/237 for corresponding International Application No. PCT/JP2012/000621 mailed May 15, 2012.

Supplemental European Search Report for corresponding European Application No. EP 12 78 810.4 issued Jun. 4, 2014.

Chinese Search Report for corresponding Chinese Application No. 201280001541.5 issued Jun. 30, 2014 and English translation.

* cited by examiner

FIG.8
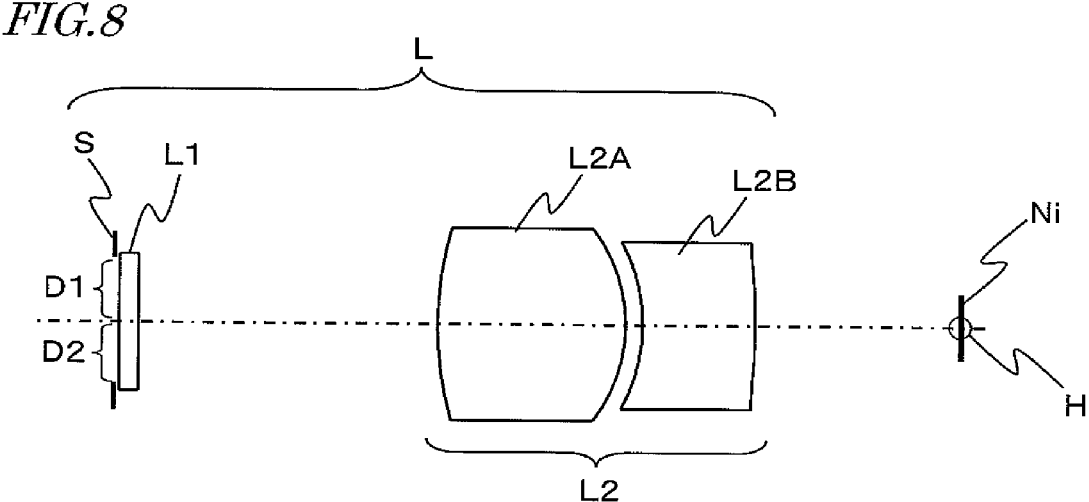
FIG.9
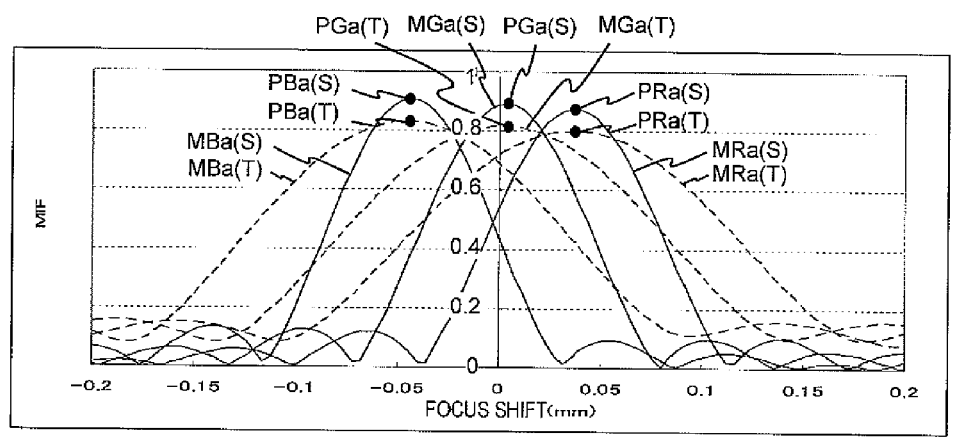
(a)
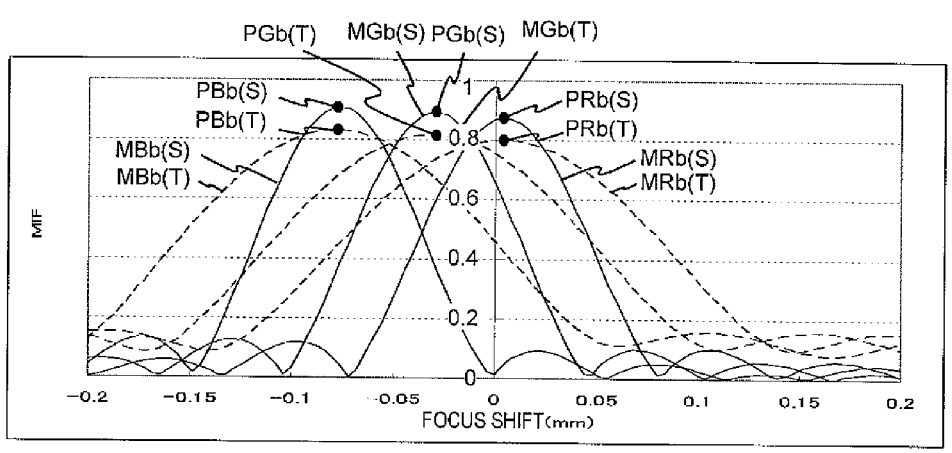
(b)

*FIG.16*
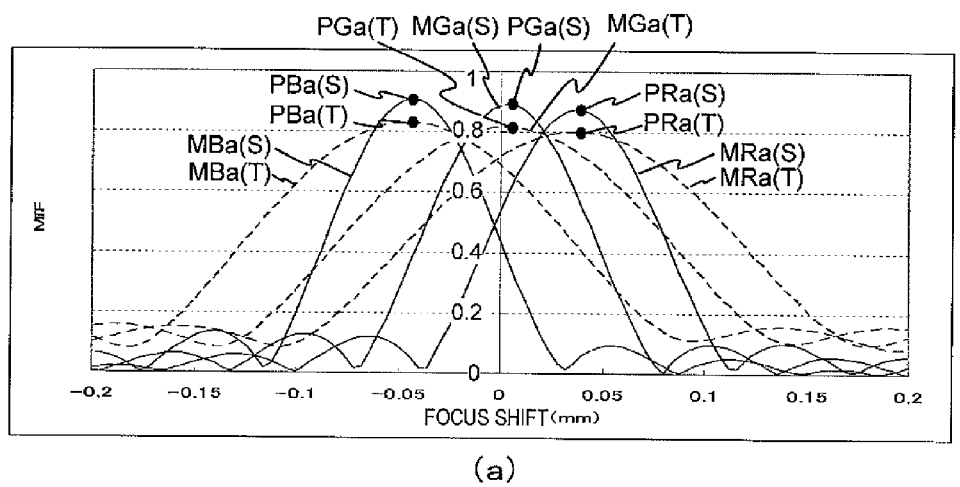
(a)
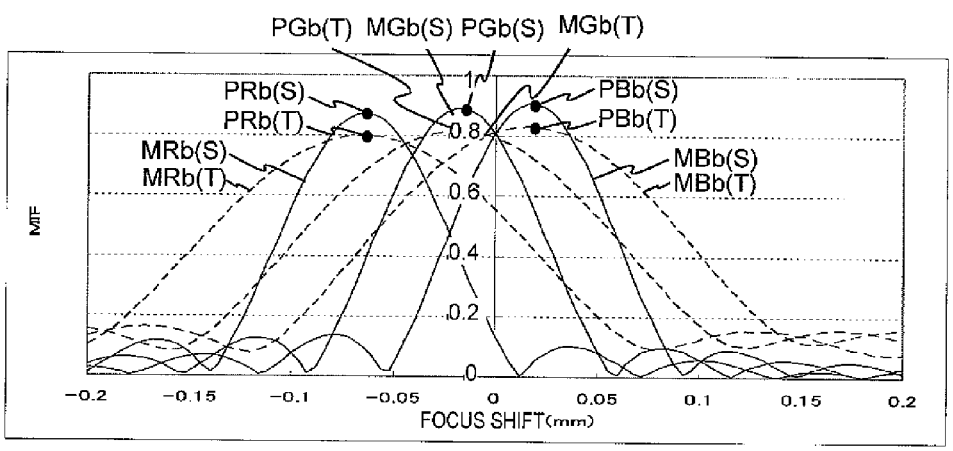
(b)

FIG.24
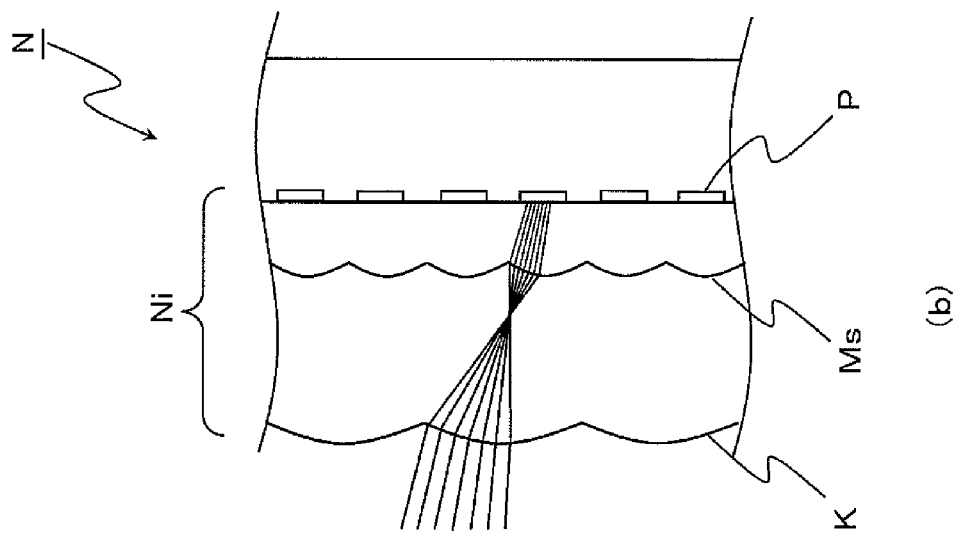
(b)
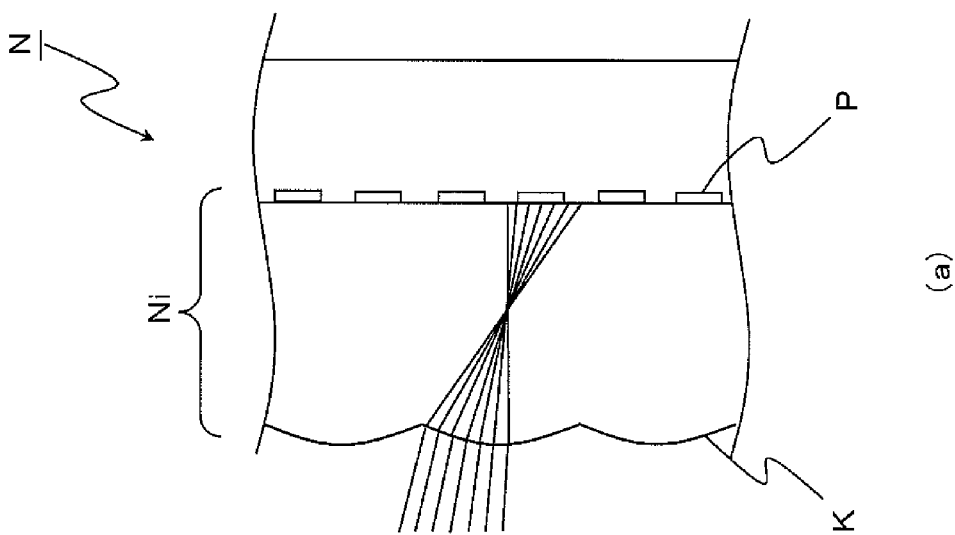
(a)

*FIG.27*
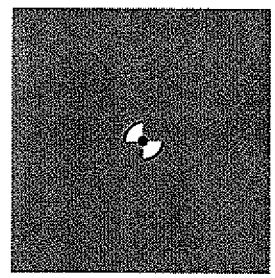
(a1)
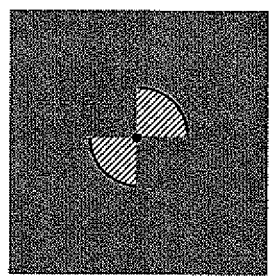
(a2)
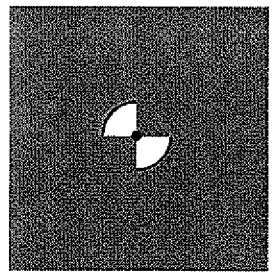
(b1)
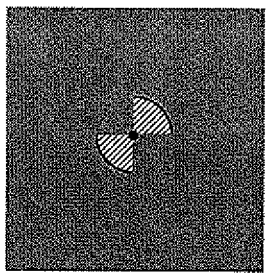
(b2)
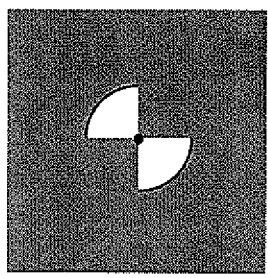
(c1)
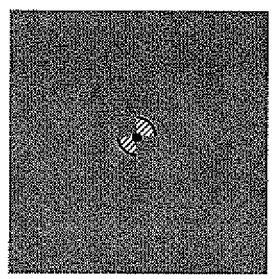
(c2)

IMAGING APPARATUS

TECHNICAL FIELD

The present invention relates to an imaging apparatus such as a camera.

BACKGROUND ART

The refractive index of light with respect to the material composing a lens differs depending on the wavelength. Therefore, when various wavelengths of light enter the optical system of an imaging apparatus, axial chromatic aberration occurs, so that images of varying sharpnesses (i.e., how sharp the images are) may be obtained depending on the color. When a color of low sharpness is contained in the image, that color becomes a cause for image quality deterioration.

In an imaging apparatus such as a camera, if the position of a subject is contained within the depth of field, focusing is attained, whereby a clear image can be imaged. In order to enable imaging of subjects located at various positions, the imaging apparatus needs to separately have a means for detecting a focusing state and a means for making a focus adjustment.

In order to solve the aforementioned problems, a technique has been proposed which, by utilizing an axial chromatic aberration of the optical system, allows the sharpness of a first color component to be reflected on a second color component which is different from the first color component, thus achieving expansion of the depth of field and correction of the axial chromatic aberration (Patent Document 1). According to the method of Patent Document 1, by allowing the sharpness of the first color component to be reflected on the second color component, the sharpness of the second color component can be enhanced. As a result, the depth of field can be increased, whereby subjects at a greater variety of distances can be relatively clearly imaged, without making focus adjustments.

CITATION LIST

Patent Literature

[Patent Document 1] Japanese National Phase PCT Laid-Open Publication No. 2008-532449

SUMMARY OF INVENTION

Technical Problem

In the construction of Patent Document 1, in order to allow the sharpness of the first color component to be reflected on the second color component, information of the sharpnesses of both of the first color component and the second color component is needed. Therefore, the depth of focus is confined to a range where the information of sharpnesses of all colors is available. Thus, with the construction of Patent Document 1, there are limits to the expansion of depth of focus, and it has been difficult to attain a sufficiently large depth of field.

Moreover, in the case where a monochromatic (e.g., blue) subject is to be imaged against a black background, for example, the image will contain no other color components (green and red) than the color of the subject. Therefore, if the subject image is blurred due to axial chromatic aberration, it would be impossible to detect the sharpness of any other color on the image and allow it to be reflected on the sharpness of the subject.

The present invention has been made in order to solve the aforementioned problems, and a main objective thereof is to provide an imaging apparatus for obtaining an image which has a large depth of focus and depth of field, and a high sharpness. Another objective of the present invention is to provide an imaging apparatus which can capture a high-sharpness image of a monochromatic (e.g., blue) subject against a black background.

Solution to Problem

An imaging apparatus according to the present invention comprises: a lens optical system having a first region in which a first color, a second color, and a third color of light pass through, and a second region in which the first color, second color, and third color of light pass through, the second region having an optical power for causing at least two or more colors of light to be converged at different positions from respective converged positions of the first color, second color, and third color of light passing through the first region; an imaging device having a plurality of first pixels and a plurality of second pixels on which light from the lens optical system is incident; an array optical device disposed between the lens optical system and the imaging device, the array optical device causing light passing through the first region to enter the plurality of first pixels, and causing light passing through the second region to enter the plurality of second pixels; and a calculation processing section for generating an output image, wherein the calculation processing section generates a first image of at least one color component among the first color, second color, and third color by using pixel values obtained at the plurality of first pixels, generates a second image containing the same color component as the at least one color component by using pixel values obtained at the plurality of second pixels, and generates the output image by using, for each color, an image component of a higher sharpness or contrast value between a predetermined region of the first image and a predetermined region of the second image.

An imaging system according to the present invention comprises: an imaging apparatus including: a lens optical system having a first region in which a first color, a second color, and a third color of light pass through, and a second region in which the first color, second color, and third color of light pass through, the second region having an optical power for causing at least two or more colors of light to be converged at different positions from respective converged positions of the first color, second color, and third color of light passing through the first region; an imaging device having a plurality of first pixels and a plurality of second pixels on which light from the lens optical system is incident; and an array optical device disposed between the lens optical system and the imaging device, the array optical device causing light passing through the first region to enter the plurality of first pixels, and causing light passing through the second region to enter the plurality of second pixels; and a calculation processing section for generating a first image of at least one color component among the first color, second color, and third color by using pixel values obtained at the plurality of first pixels, generates a second image containing the same color component as the at least one color component by using pixel values obtained at the plurality of second pixels, and generates the output image by using, for each color, an image component of a higher sharpness between a predetermined region of the first image and a predetermined region of the second image.

Advantageous Effects of Invention

According to the present invention, between predetermined regions of two or more images, an output image is generated based on an image component of the higher sharpness for each color, thus enhancing the sharpness of the output image through a simple technique. Moreover, the depth of focus can be made greater than conventional, whereby a sufficiently large depth of field can be obtained.

Furthermore, according to the present invention, when imaging a monochromatic subject of red, green, or blue against a black background, the sharpness of the subject color is greater than a predetermined value in either one of the two or more imaging regions. As a result, an image with a high sharpness can be generated.

BRIEF DESCRIPTION OF DRAWINGS

FIG. 8 A cross-sectional view showing an imaging apparatus A according to Embodiment 1 of the present invention.

FIG. 9 (a) is a graph showing through-focus MTF characteristics of rays passing through a first optical region D1 according to Embodiment 1 of the present invention. (b) is a graph showing through-focus MTF characteristics of rays passing through a second optical region D2.

FIG. 16 (a) is a graph showing through-focus MTF characteristics of rays passing through a first optical region D1 according to Embodiment 2 of the present invention. (b) is a graph showing through-focus MTF characteristics of rays passing through a second optical region D2.

FIGS. 24 (a) and (b) are diagrams showing, enlarged, array optical devices K and imaging devices N according to Embodiment 5 of the present invention.

FIGS. 27 (a1), (b1), and (c1) are diagrams schematically showing the images of point images obtained by adding the pixel values of pixels of odd rows and odd columns and pixels of even rows and even columns. (a2), (b2), and (c2) are diagrams schematically showing the images of point images obtained by adding the pixel values of pixels of even rows and odd columns and pixels of odd rows and even columns.

DESCRIPTION OF EMBODIMENTS

Hereinafter, embodiments of the imaging apparatus according to the present invention will be described with reference to the drawings.

Embodiment 1

Figure 1:
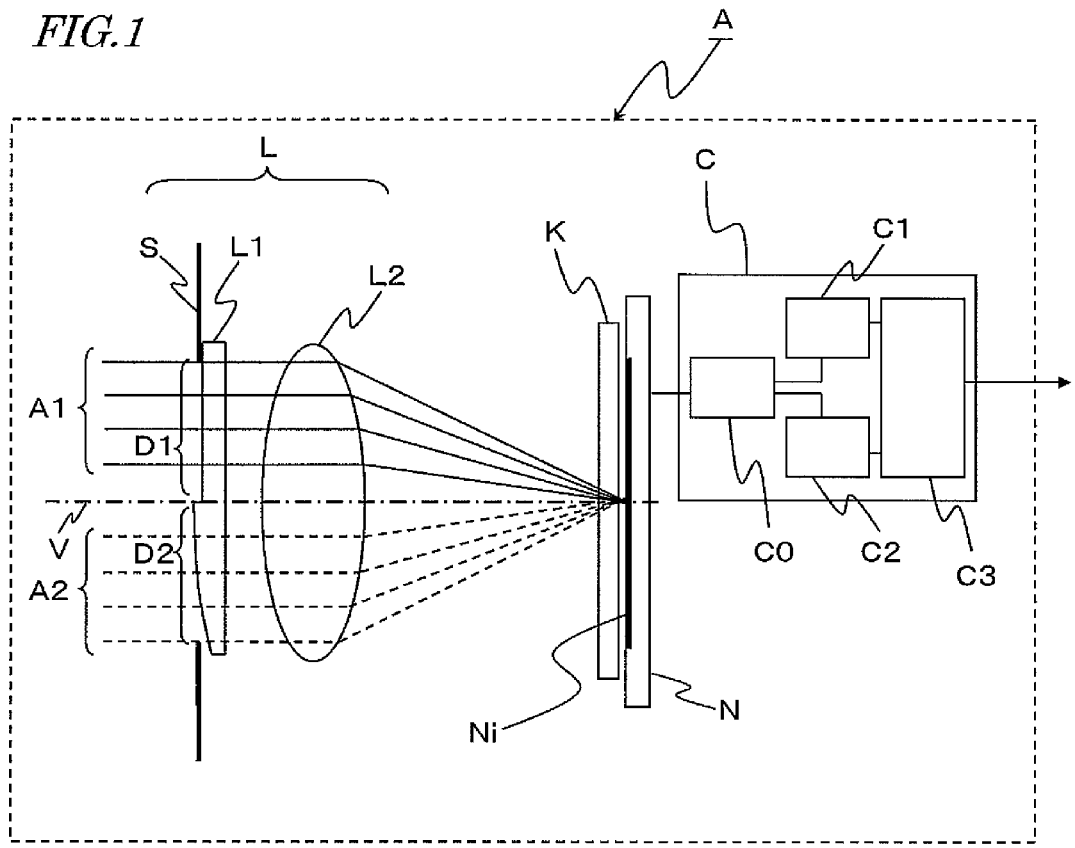
FIG. 1 A schematic diagram showing a first embodiment of an imaging apparatus A according to the present invention.

FIG. 1 is a schematic diagram showing an imaging apparatus A according to Embodiment 1. The imaging apparatus A of the present embodiment includes: a lens optical system L with an optical axis V; an array optical device K located near a focal point of the lens optical system L; an imaging device N; and a calculation processing section C.

The lens optical system L has a first optical region D1 and a second optical region D2 having mutually different optical powers, and is composed of a stop (stop or diaphragm) S through which light from a subject (not shown) enters, an optical device L1 through which the light through the stop S passes, and a lens L2 which is struck by the light having passed through the optical device L1. Although the lens L2 is illustrated as being a single lens, it may be composed of a plurality of lenses. In FIG. 1, a light beam A1 is a light beam that passes through the first optical region D1 of the optical device L1, whereas the light beam A2 is a light beam that passes through the second optical region D2 of the optical device L1. The light beams A1 and A2 pass through the stop S, the optical device L1, the lens L2, and the array optical device K in this order, and reach an imaging plane Ni of the imaging device N.

Figure 2:
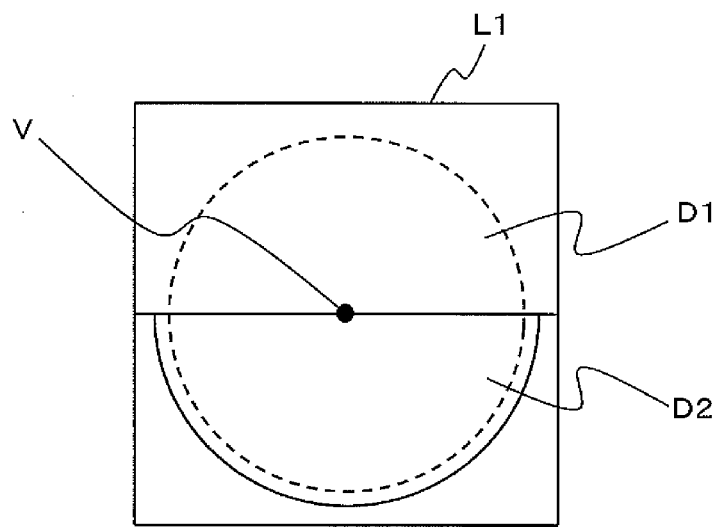
FIG. 2 A front view showing an optical device L1 according to Embodiment 1 of the present invention from the subject side.

FIG. 2 is a front view of the optical device L1 from the subject side. The first and second optical regions D1 and D2 of the optical device L1 are two upper and lower portions divided so that the optical axis V is at a center of boundary therebetween. In the light having passed through the first and second optical regions D1 and D2, red, green, and blue colors of light converge at different positions on the optical axis. Moreover, the first and second optical regions D1 and D2 have mutually different optical powers. Specifically, the second optical region D2 has an optical power for causing red, green, and blue colors of light to be converged at different positions from the converged positions of red, green, and blue colors of light passing through the first optical region D1. In FIG. 2, a broken line s shows where the stop S is.

The array optical device K is located near a focal point of the lens optical system L, and is located at a position which is a predetermined distance away from the imaging plane Ni.

Figure 3:
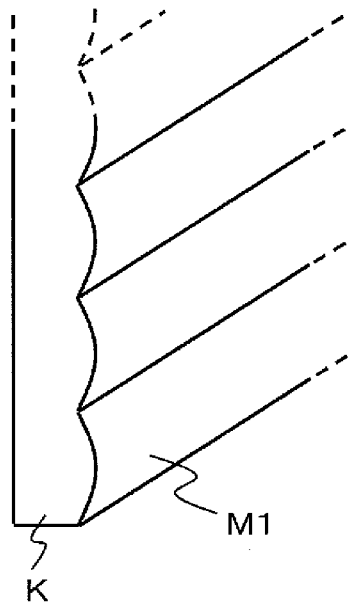
FIG. 3 A perspective view of an array optical device K according to Embodiment 1 of the present invention.

FIG. 3 is a perspective view of the array optical device K. On a face of the array optical device K that is closer to the imaging device N, a plurality of optical elements M1 which are elongated along the lateral direction are disposed in the vertical direction. The cross section (vertical direction) of each optical element M1 has a circular arc shape protruding toward the imaging device N. Thus, the array optical device K has a lenticular lens construction.

Figure 4:
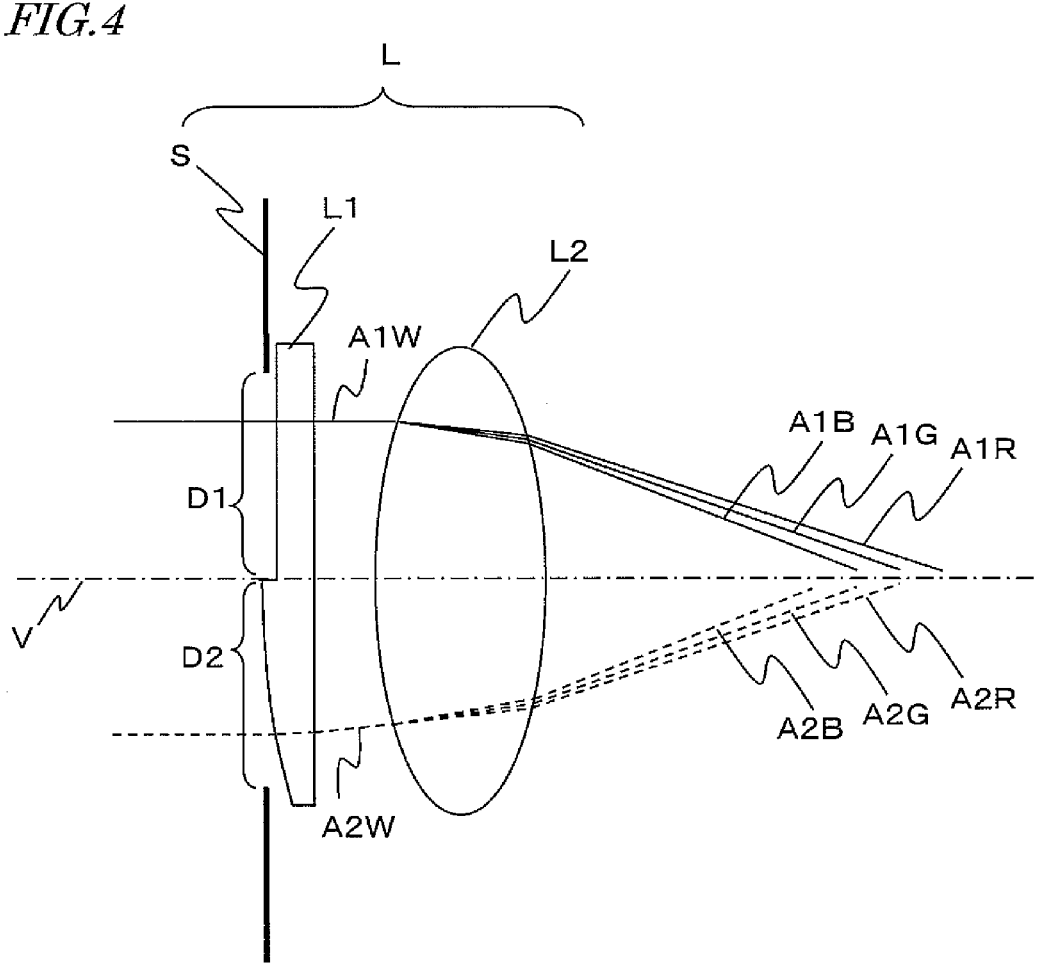
FIG. 4 A diagram schematically showing optical paths of rays of a first color, a second color, and a third color according to Embodiment 1 of the present invention.

FIG. 4 is a diagram schematically showing optical paths of a ray A1W and a ray A2W respectively having passed through the first optical region D1 and the second optical region D2.

When the ray A1W enters the lens L2 via a portion of the optical device L1 that is located in the first optical region D1, due to axial chromatic aberration, rays gather in the order of blue (A1B), green (A1G), and red (A1R) toward an image surface on the optical axis of the lens L2.

Similarly, when the ray A2W enters the lens L2 via a portion of the optical device L1 that is located in the second optical region D2, due to axial chromatic aberration, rays gather in the order of blue (A2B), green (A2G), and red (A2R) toward the image surface on the optical axis of the lens L2. However, since the second optical region D2 has a different optical power from that of the first optical region D1, these gather at positions respectively shifted from the rays passing through the first optical region D1.

Figure 5:
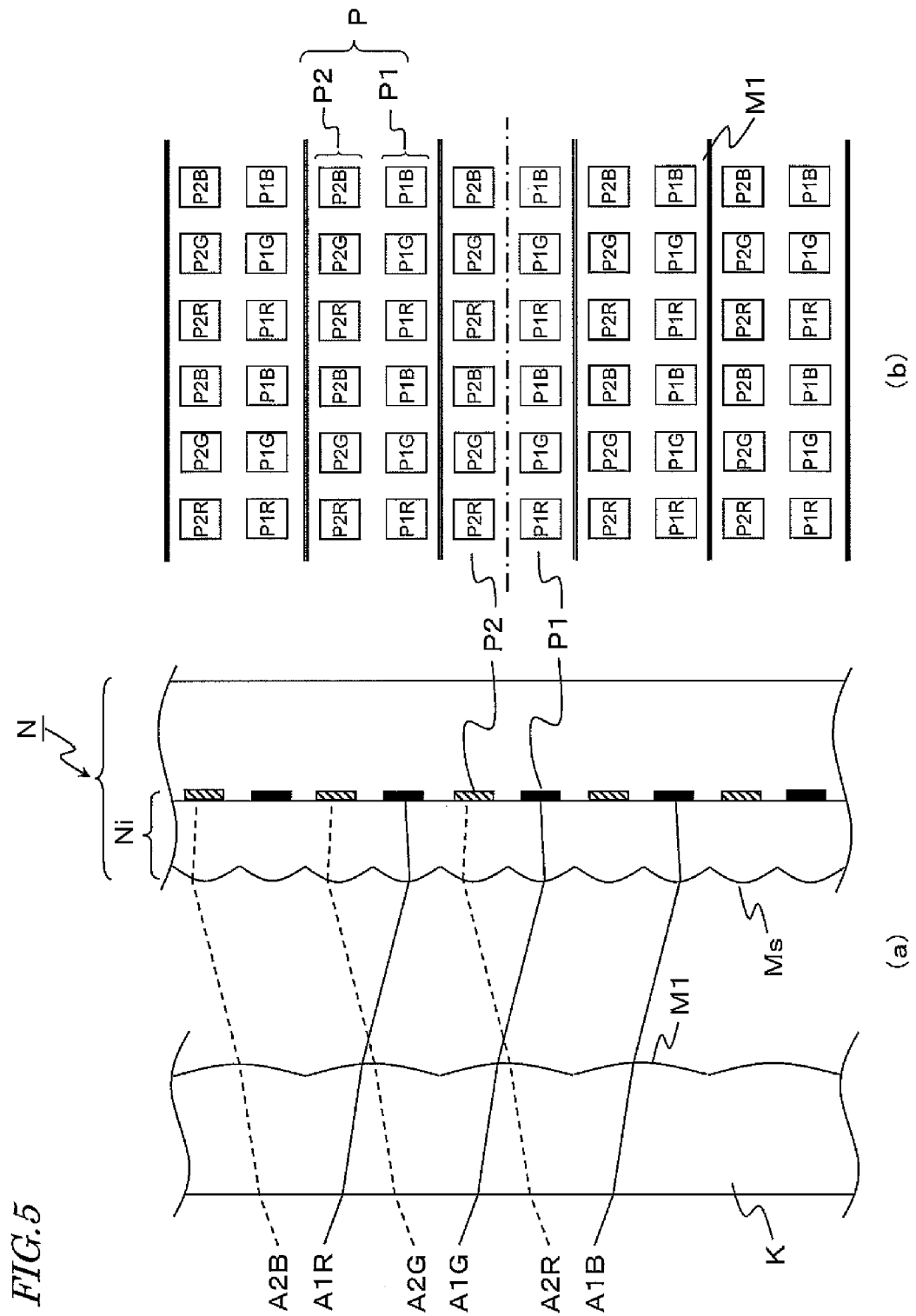
FIG. 5 (a) is a diagram showing enlarged the array optical device K and imaging device N shown in FIG. 1 according to the present Embodiment 1. (b) is a diagram showing relative positioning of the array optical device K and pixels of the imaging device N.

FIG. 5(a) is a diagram showing enlarged the array optical device K and imaging device N shown in FIG. 1; and FIG. 5(b) is a diagram showing relative positioning of the array optical device K and pixels on the imaging device N. Pixels P1 and pixels P2, respectively, form one row along the lateral direction (row direction). Along the vertical direction (column direction), pixels P1 and P2 alternate. The pixels P1 are composed of pixels P1R for detecting red light, pixels P1G for detecting green light, and pixels P1B for detecting blue light. Also, the pixels P2 are composed of pixels P2R for detecting red light, pixels P2G for detecting green light, and pixels P2B for detecting blue light. A filter which transmits red light is provided on the surface of the pixels P1R, P2R for detecting red light; a filter which transmits green light is provided on the surface of the pixels P1G, P2G for detecting green light; and a filter which transmits blue light is provided on the surface of the pixels P1B, P2B for detecting blue light. Thus, since filters for transmitting light of different wavelength bands are provided on the surface of the respective pixels P1 and P2, each pixel is able to mainly detect light of the color of R (red), G (green), or B (blue).

The array optical device K is disposed so that one of its optical elements M1 would correspond to two rows of pixels, i.e., one row of pixels P1 and one row of pixels P2, on the imaging plane Ni. On the imaging plane Ni, microlenses Ms are provided so as to cover the surface of the pixels P1 and P2.

The array optical device K is designed so that a large part of the light beam (light beam A1 indicated by a solid line in FIG. 1) passing through the first optical region D1 (shown in FIG. 1, FIG. 2) of the optical device L1 reaches the pixels P1 on the imaging plane Ni, and that large part of the light beam (light beam A2 indicated by a broken line in FIG. 1) passing through the second optical region D2 reaches the pixels P2 on the imaging plane Ni. Specifically, the above construction is realized by appropriately setting parameters such as the refractive index of the array optical device K, the distance from the imaging plane Ni, and the radius of curvature of surface of each optical element M1.

Figure 6:
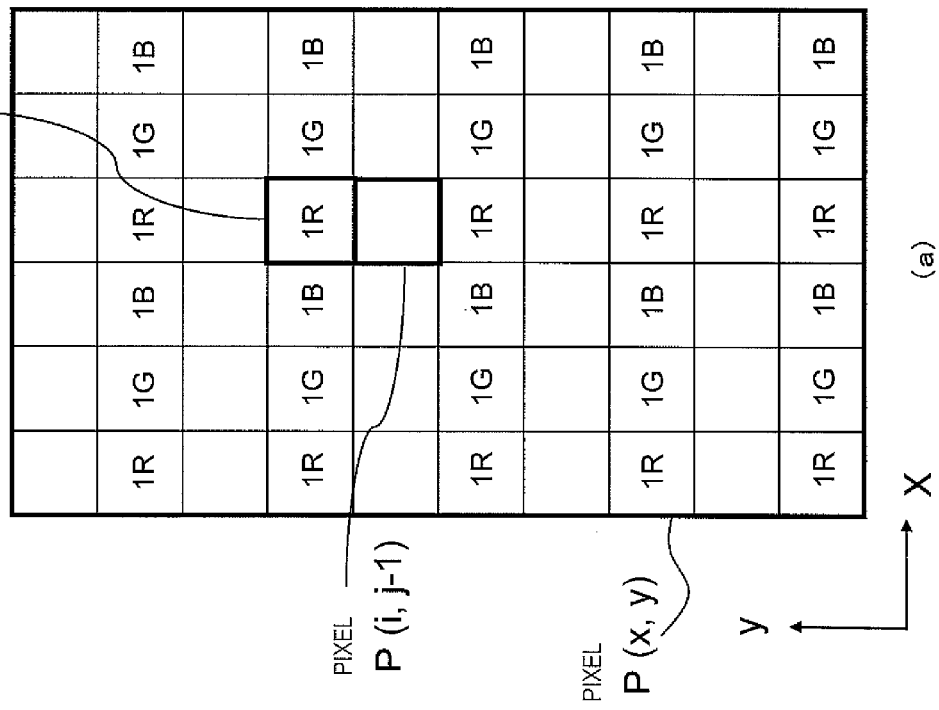
FIG. 6 (a) shows a first color image which is obtained with a plurality of pixels P1; and (b) shows a second color image which is obtained with a plurality of pixels P2.

First image information which is obtained with the plurality of pixels P1 in FIG. 5(b) is shown in FIG. 6(a), and second image information which is obtained with the plurality of pixels P2 is shown in FIG. 6(b). Note that the image information which is obtained by the imaging device N is separated by the calculation processing section C into the first image information and the second image information.

As shown in FIG. 6(a), in the first image information, a luminance value (pixel value) which is obtained with a pixel P1 is given to each pixel P(x, y).

As shown in FIG. 5(b), as the pixels P1, pixels P1R, P1G, and P1B for respectively detecting red, green, and blue colors of light are sequentially arranged along the lateral direction (row direction). Therefore, in the first image information, too, a pixel providing a red luminance value 1R, a pixel providing a green luminance value 1G, and a pixel providing a blue luminance value 1B are sequentially arranged along the lateral direction. Thus, each luminance value in the first image information only has one color of chromatic information for one pixel; therefore, luminance values from the neighboring pixels may be used to complement the chromatic information for the other two colors. For example, when a red luminance value is obtained for a given pixel P(i,j), the pixel P(i,j) may be complemented with green and blue luminance values. For complementation to obtain a green luminance value, the green luminance values of the pixel P(i−2,j) and pixel P(i+1,j) are used. In order to increase contribution of regions near the pixel P(i,j), for example, a value which is obtained through a weighted average of the luminance value of the pixel. P(i−2,j) and the luminance value of the pixel P(i+1,j) at a ratio of 1:2 may be used as the green luminance value of the pixel P(i,j). Similarly, a value which is obtained through a weighted average of the luminance value of the pixel P(i−1,j) and the luminance value of the pixel P(i+2,j) at a ratio of 2:1 may be used as the blue luminance value of the pixel P(i,j).

Furthermore, in each of the first and second image information, the luminance information of the image along the vertical direction (column direction) is missing in every other row. The missing luminance information of a pixel P(x, y) may be generated through complementation based on luminance values that adjoin along the vertical direction (column direction). For example, in the first image shown in FIG. 6(a), the luminance information of the pixel P(i,j−1) is missing. In this case, the pixel P(i,j−1) can be complemented by taking an average of the luminance information of the pixel P(i,j) and the pixel P(i,j−2).

Figure 7:
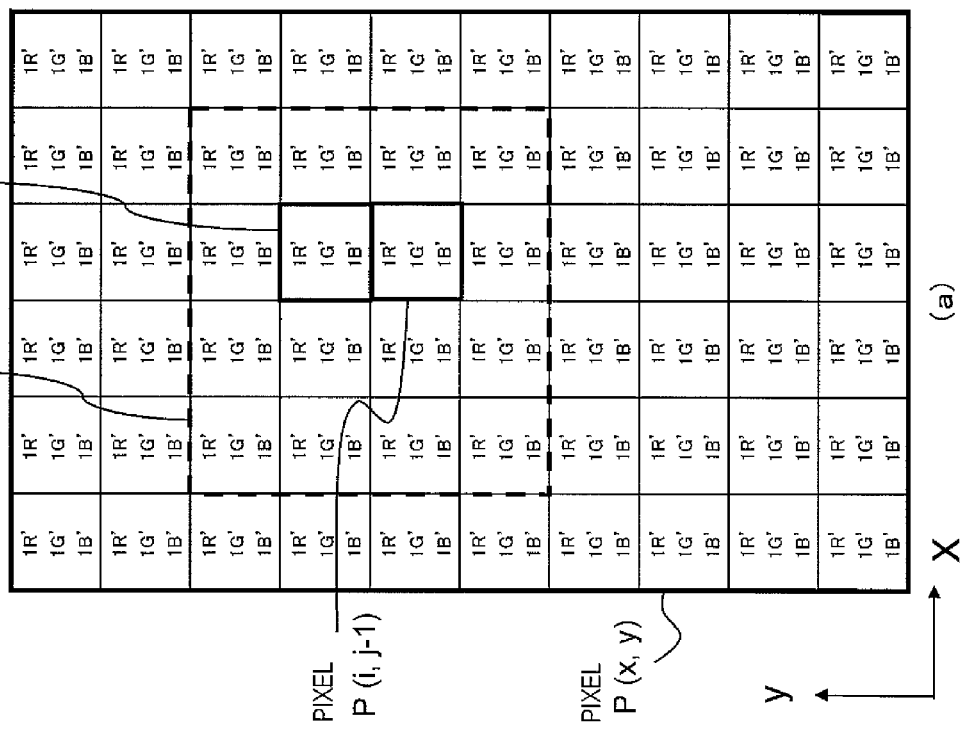
FIGS. 7 (a) and (b) are diagrams showing first and second color images.

Through the above complementation process, a first color image as shown in FIG. 7(a) and a second color image as shown in FIG. 7(b) are generated. The first color image has chromatic information 1R', 1G', and 1B' of red (R), green (G), and blue (B) for each pixel, whereas the second color image has chromatic information 2R', 2G', and 2B' of red (R), green (G), and blue (B) for each pixel. Hereinafter, "first color image" and "second color image" will usually refer to images after complementation.

According to the present embodiment, the converged positions of the blue (B), green (G), and red (R) rays having passed through the first optical region D1 of the optical device L1 are shifted from the converged positions of the blue (B), green (G), and red (R) rays having passed through the second optical region D2, and vice versa. Therefore, the respective sharpnesses of blue, green, and red in the image which is obtained with the pixels P1 differ from the respective sharpnesses of blue, green, and red in the image obtained with the pixels P2.

These differences are utilized so that, between the first color image which is obtained with the pixels P1 and the second color image which is obtained with the pixels P2, an image component of the higher sharpness is used for each of blue, green, and red, thereby generating an output image which has a high sharpness (or resolution) for each color. In the case where the first color image and the second color image do not contain all of blue, green, and red, an image component that happens to have the higher sharpness for each of the colors which are contained in these images may be used, whereby an output image having a high sharpness with respect to the colors contained in the images can be obtained. Such a process can be performed by the calculation processing section C.

As the sharpness increases, the blur of an image will decrease, and therefore the difference in luminance value (difference in gray scale level) between adjoining pixels is usually considered to increase. Therefore, in the present embodiment, sharpness is determined based on a difference in luminance value between adjoining pixels within a predetermined microregion of an acquired image. The microregion may be a single pixel P(x, y) shown in FIG. 7, or may be a region R1(u, v) in which a plurality of pixels P(x, y) are combined.

Alternatively, sharpness may be determined based on a frequency spectrum which is obtained by applying a Fourier transform to the luminance values of the first color image and the second color image. In this case, a response at a predetermined spatial frequency may be determined as a sharpness. In other words, through a comparison between responses at a predetermined spatial frequency, an image sharpness can be evaluated to be high or low. Since an image is two-dimensional, a method which determines sharpness by using a two-dimensional Fourier transform is desirable.

The stop S is a region where a light beam will pass through at every angle of view. Therefore, by allowing a face having optical characteristics for controlling optical power to be inserted near the stop S, it becomes possible to control the convergence characteristics of the light beam at all angles of view alike. In other words, in the present embodiment, the optical device L1 may be provided near the stop S. By providing near the stop S the optical regions D1 and D2 having optical powers for ensuring that the converged positions of at least two or more colors of light are mutually different, it becomes possible to confer convergence characteristics which are adapted to the number of divided regions to the light beam.

In FIG. 1, the optical device L1 is provided between the stop S and the lens L2, at a position such that light passing through the stop S enters the optical device L1 directly (i.e., not via any other optical member). The optical device L1 may be disposed on the subject side of the stop S. In this case, light passing through the optical device L1 may enter the stop S directly (i.e., not via any other optical member). In the case of an image-side telecentric optical system, the incident angle of a ray at a focal point of the optical system is unequivocally determined by the position of the ray passing through the stop S. Moreover, the array optical device K has a function of branching out into outgoing directions depending on the incident angle of the ray. Therefore, the light beam can be branched out over the pixels on the imaging plane Ni so as to correspond to the optical regions D1 and D2 as divided near the stop S.

Next, a specific method of deepening the depth of field will be described.

FIG. 8 is a cross-sectional view showing the imaging apparatus A according to Embodiment 1. In FIG. 8, constituent elements identical to those in FIG. 1 are denoted by the same numerals as those in FIG. 1. However, in FIG. 8, the lens L2 is composed of two pieces, i.e., a lens L2A and a lens L2B. Although the array optical device K (shown in FIG. 1 and the like) is omitted from illustration in FIG. 8, the array optical device K is actually provided in a region H in FIG. 8. The region H has the construction shown in FIG. 5(a).

Table 1 and Table 2 show design data for the optical system of the imaging apparatus A shown in FIG. 8. In Table 1 and Table 2, Ri represents a paraxial radius of curvature (mm) of each surface; di represents an inter-surface-center interval (mm) of each surface; nd represents a d-line refractive index of the lens or filter; and vd represents a d-line Abbe number of each optical device. Moreover, an aspherical shape is expressed by (math. 1), where x is a distance from a tangent plane of the surface vertex in the optical axis direction; h is a height from the optical axis; r is a paraxial radius of curvature; k is a conical constant; and $A_m$ (m=4, 6, 8) is an $m^{th}$ aspheric coefficient.

$$x = \frac{\frac{1}{r}h^2}{1 + \sqrt{1-(1+k)\left(\frac{1}{r}\right)^2 h^2}} + A_4 h^4 + A_6 h^6 + A_8 h^8 \qquad [\text{math. 1}]$$

TABLE 1

Lens data
Focal length = 10 mm, F value = 2.8
Angle of view 2ω = 10°
Effective imaging circle diameter = φ1.78 mm

| Surface number | Ri | | di | nd | vd |
|---|---|---|---|---|---|
| Object | ∞ | | 4000 | — | — |
| Stop | ∞ | | 0 | — | — |
| L1-R2 | Rregion D1 | ∞ | 0.5 | 1.5253 | 56.0 |
|  | Rregion D2 | 1600 | | | |
| L1-R2 | ∞ | | 8 | | |
| L2A-R1 | 7.375177 | | 5 | 1.5253 | 56.0 |
| L2A-R2 | −4 | | 0.45 | — | — |
| L2B-R1 | −4.194611 | | 3 | 1.585 | 29 |
| L2B-R2 | −13.548 | | 5.5 | — | — |
| Image surface | ∞ | | — | — | — |

TABLE 2

Aspheric coefficient

| | k | A4 | A6 | A8 |
|---|---|---|---|---|
| L2A-R1 | −0.296987 | −0.001152745 | −0.0000844121 | −0.0000089033 |
| L2A-R2 | 0 | −0.001758404 | 0.000448016 | 0.0000017356 |
| L2B-R1 | 0 | −0.000853458 | 0.000389826 | 0.000073819 |
| L2B-R2 | 0 | 0.00199215 | −0.0000950161 | 0.0000608074 |

In this design example, within the subject-side face of the optical device L1, the face located in the first optical region D1 is a plane, whereas the face located in the second optical region D2 is an optical surface constituting a spherical lens with a radius of curvature of 1600 mm. With such a construction, the rays having passed through each optical region as described above gather at mutually shifted positions, from color to color.

FIG. 9 shows through-focus MTF characteristics, on the optical axis, of rays passing through the first optical region D1 and the second optical region D2 in the lens optical system L (simulation results). The graph of FIG. 9(a) shows through-focus MTF characteristics associated with rays passing through the first optical region D1, whereas the graph of FIG. 9(b) shows through-focus MTF characteristics associated with rays passing through the second optical region D2. In FIG. 9, the horizontal axis represents focus shift, and the vertical axis represents MTF at a spatial frequency of 50 Lp/mm. Taking into consideration the fact that rays passing through the respective optical regions are separable through the array optical device, the through-focus MTF characteristics associated with rays passing through the first optical region D1 are calculated while shading the stop face lying immediately before the second optical region D2, whereas the through-focus MTF characteristics associated with rays passing through the second optical region D2 are calculated while shading the stop face lying immediately before the first optical region D1. In other words, the respective through-focus MTF characteristics are calculated with respect to the case where a semicircular-shaped stop face is used.

In a generic optical system, a sagittal direction and a tangential direction of an MTF value on the optical axis would be identical. In the present embodiment, when an MTF value is to be calculated for each ray passing through the respective optical region, since each immediately preceding stop face is a semicircular shape, the sagittal direction and the tangential direction of the MTF value on the optical axis will be separated as shown in FIG. 9.

In the graph showing the characteristics associated with rays passing through the first optical region D1, MBa, MGa, and MRa respectively represent the through-focus MTF characteristics of blue, green, and red. Moreover, PBa, PGa, and PRa represent the respective peak positions. Similarly, in the graph showing the characteristics associated with rays passing through the second optical region D2, MRb, MGb, and MBb respectively represent the through-focus MTF characteristics of red, green, and blue. Moreover, PRb, PGb, and PBb represent the respective peak positions. Herein, S and T in the parentheses of each alphanumeric expression respectively represent the sagittal direction and the tangential direction.

Figure 10:
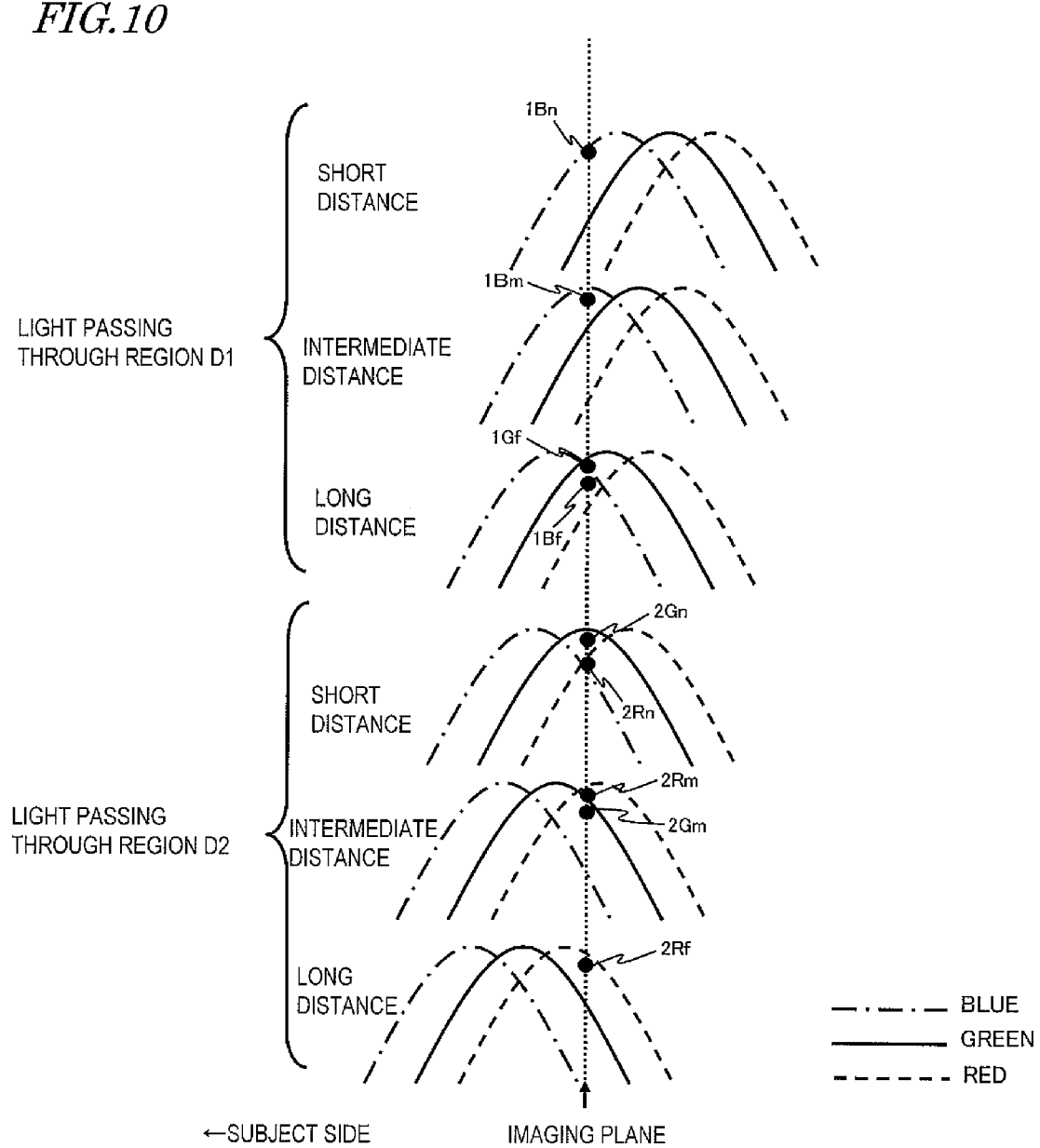
FIG. 10 A diagram schematically showing through-focus MTF characteristics of rays passing through the first optical region D1 and through-focus MTF characteristics of rays passing through the second optical region D2 according to Embodiment 1 of the present invention, with respect to different subject distances.

FIG. 10 is a diagram schematically showing through-focus MTF characteristics associated with rays passing through the first optical region and through-focus MTF characteristics associated with rays passing through the second optical region, with respect to different subject distances. It is indicated that sharpness increases as an MTF on the imaging plane increases. In FIG. 10, only the through-focus MTF characteristics in the sagittal direction, which have shallow depths in FIG. 9, are extracted for schematic illustration.

In a generic imaging optical system, as the distance from the subject becomes closer to a lens, light passing through the lens will gather in a farther region from the lens (a region farther from the subject). Therefore, when the subject distance is classified into a short distance, an intermediate distance, and a long distance, as shown in FIG. 10, the peak positions of the MTF characteristics will be at farther positions from the lens in the order of short distance, intermediate distance, and long distance. Thus, depending on how long the subject distance is, a difference in terms of the MTF value of each color may occur between an image which is formed by the rays passing through the first optical region D1 and an image which is formed by the rays passing through the second optical region D2.

In the case where the subject distance is a short distance, as shown in FIG. 10, a blue 1Bn MTF value associated with rays passing through the first optical region D1 is greater than the blue MTF value associated with rays passing through the second optical region D2. On the other hand, a green 2Gn MTF value associated with rays passing through the second optical region D2 is greater than the green MTF value associated with rays passing through the first optical region D1. Moreover, a red 2Rn MTF value associated with rays passing through the second optical region D2 is greater than the red MTF value associated with rays passing through the first optical region D1. If the higher MTF value is to be selected for each color, the blue 1Bn MTF value associated with rays passing through the first optical region D1 and the green 2Gn MTF value and the red 2Rn MTF value associated with rays passing through the second optical region D2 are selected.

By a similar method, in the case of an intermediate distance, a blue 1Bm MTF value associated with rays passing through the first optical region D1 and a red 2Rm MTF value and green 2Gm MTF value associated with rays passing through the second optical region D2 are selected. In the case of a long distance, a green 1Gf MTF value and a blue 1Bf MTF value associated with rays passing through the first optical region D1 and a red 2Rf MTF value associated with rays passing through the second optical region D2 are selected.

When designing the lens optical system L, the design is to be made so that the through-focus MTF characteristics shown in FIG. 10 are attained. In doing so, an MTF value which will lead to a desired sharpness is set as a boundary value. Then, the depth of field is essentially defined by a range of subject distance (a range encompassing the short distance, the intermediate distance, and the long distance in FIG. 10) in which, with respect to each color of the images that are obtained with rays passing through the first optical region D1 and the second optical region D, the higher MTF value exceeds the aforementioned boundary value. Note that the "boundary value" is a predetermined value Md shown in FIG. 11 and the like; this predetermined value Md will be described later.

Since an MTF is an indication of how faithfully the contrast of a subject is reproduced on an image surface, calculation of an MTF value requires a spatial frequency of the subject. This makes it impossible to directly detect an MTF value from a given arbitrary image in actual imaging. Therefore, in actual imaging, a difference in luminance value is used for evaluating the sharpness to be high or low. The higher the sharpness is, the smaller the image blur is; therefore, usually, an image having a higher sharpness contains greater differences in luminance value between adjoining pixels.

Specifically, first, in an image separation section C0 of the calculation processing section C shown in FIG. 1, an image which is obtained at the imaging plane Ni is separated (generated) into a first color image which is formed only by the plurality of pixels P1 and a second color image which is formed only by the plurality of pixels P2. Next, a first sharpness detection section C1 calculates a sharpness based on differences in luminance value between adjoining pixels within a predetermined microregion of the first color image. Similarly, a second sharpness detection section C2 also calculates a sharpness based on differences in luminance value between adjoining pixels within a predetermined microregion of the second image. Next, an image generation section C3 is able to determine that, between the sharpness calculated from within the predetermined microregion of the first color image and the sharpness calculated form within the predetermined microregion of the second color image, the one with a greater value is the higher sharpness. Such determination is made for each color component (red, blue, green) with respect to each predetermined microregion.

When the first optical region D1 and the second optical region D2 are designed by the above method, if the subject exists within the depth of field, the greater sharpness between the sharpness calculated from the pixels P1 and the sharpness calculated from the pixels P2 will be equal to or greater than the desired value. Therefore, without having to measure the distance to the subject, a high sharpness image can be selected for each color through comparison of the absolute values of differences in luminance value.

As for means of color image synthesis, a technique of synthesizing one output image by selecting each high-sharpness color as described above, or a technique of merging two color images through color-by-color additions may be used. With these methods, an output image which retains high sharpness despite changes in the subject distance can be generated.

Figure 11:
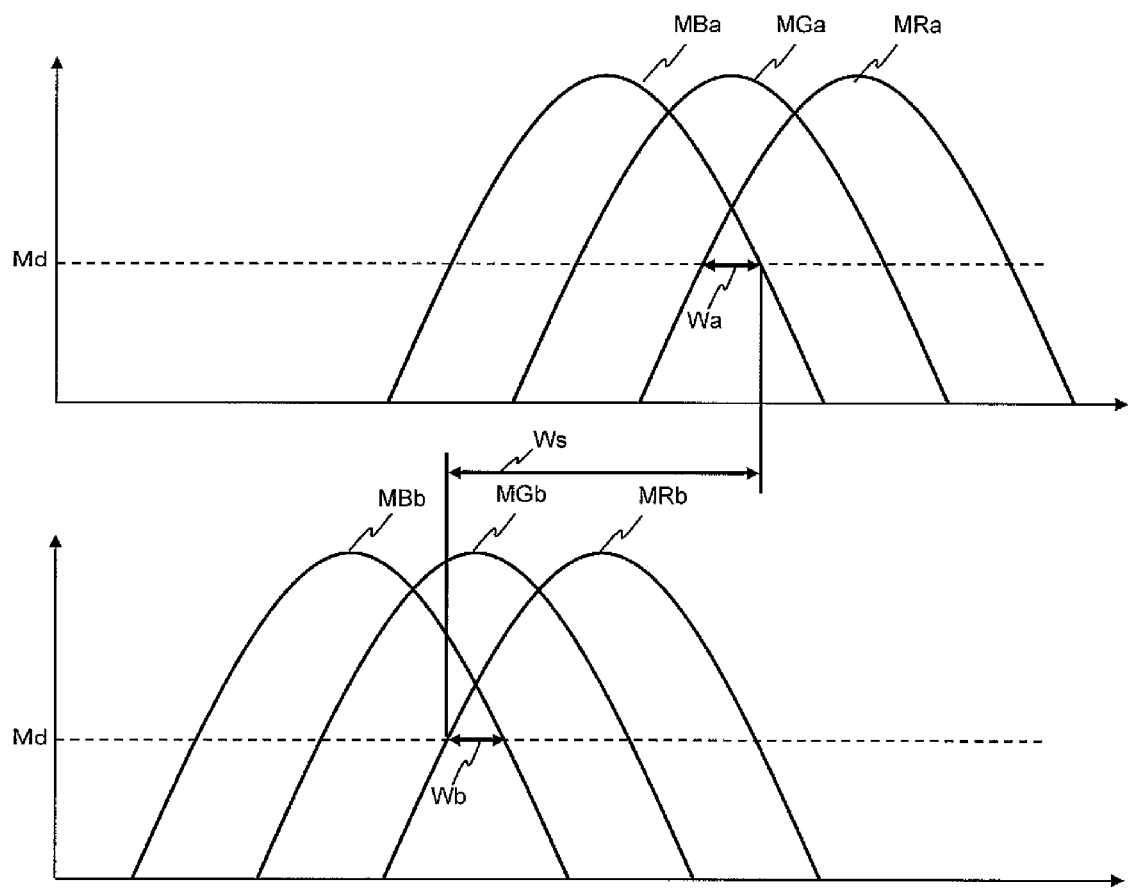
FIG. 11 A diagram schematically showing through-focus MTF characteristics of rays passing through the first optical region D1 and through-focus MTF characteristics of rays passing through the second optical region D2 according to Embodiment 1 of the present invention.

Next, the range of axial chromatic aberration of rays passing through the first optical region D1 and the second optical region D2 will be discussed. The upper graph of FIG. 11 shows through-focus MTF characteristics (sagittal direction) of rays passing through the first optical region D1, whereas the lower graph of FIG. 11 shows through-focus MTF characteristics (sagittal direction) of rays passing through the second optical region D2. In FIG. 11, the vertical axis represents MTF values of red, green, and blue at a predetermined spatial frequency, and the horizontal axis represents positions on the optical axis.

In FIG. 11, curves MBa, MGa, and MRa respectively represent MTF characteristics of blue, green, and red. The curves MBa, MGa, and MRa overlap one another. Curves MRb, MGb, and MBb respectively represent MTF characteristics of red, green, and blue. The curves MRb, MGb, and MBb overlap one another. The predetermined value Md is the aforementioned "boundary value", such that any MTF value that is equal to or greater than this value essentially falls within the depth of focus.

Moreover, Wa in the upper graph of FIG. 11, or Wb in the lower graph, is a region in which the blue, green, and red MTF values of rays passing through the respective optical region are greater than the predetermined value Md, this range essentially defining a respective depth of focus of rays passing through the first or second optical region D1 or D2. Moreover, when the subject-side surface of the optical device L1 is planar in both of the first optical region D1 and the second optical region D2, the through-focus MTF characteristics will be the upper graph of FIG. 11 in both the sagittal direction and the tangential direction; even in the case of a usual optical system which does not involve divided regions, Wa defines the region where all of the blue, green, and red MTF values are greater than the predetermined value Md, this range essentially defining the depth of focus. Similarly, when the subject-side surface of the optical device L1 is spherical in both of the first optical region D1 and the second optical region D2, the through-focus MTF characteristics will be the lower graph of FIG. 11 in both of the sagittal direction and the tangential direction; even in the case of a usual optical system which does not involve divided regions, Wb defines the region where all of the blue, green, and red MTF values are greater than the predetermined value Md, this range essentially defining the depth of focus.

On the other hand, in a range Ws shown in FIG. 11, either the MTFs associated with rays passing through the first optical region D1 or the MTFs associated with rays passing through the second optical region D2 are equal to or greater than the predetermined value Md for all colors.

Since a sharpness which is calculated from the image generated from rays passing through the first optical region D1 and a sharpness which is calculated from the image generated from rays passing through the second optical region D2 are both derived, and the image with the higher sharpness is selected for each color to generate an output image, the range Ws in FIG. 11 essentially defines the depth of focus, whereby a broader depth of focus is being obtained than the respective depth of focus of rays passing through the first or second optical region D1 or D2.

According to the present embodiment, between a microregion of the first color image generated from rays passing through the first optical region D1 and a microregion of the second color image generated from rays passing through the second optical region D2, an image component of the higher sharpness for each color is used to generate an output image, thus enhancing the sharpness of the output image through a simple technique. Moreover, as shown in FIG. 11, irrespective of where in the range Ws the imaging plane happens to be positioned, it is ensured that the MTFs for all of the three colors are greater than the predetermined value Md. Therefore, the depth of focus can be made much greater than conventional, whereby a sufficiently large depth of field can be obtained. Furthermore, according to the present embodiment, without using any means for detecting a focusing state or any adjustment means, images of subjects at a greater variety of subject distances can be captured.

In the case where an image contains a plurality of subjects at different subject distances, an image having the higher sharpness for each color may be selected for each respective image region to generate an output image.

In the present embodiment, when imaging a monochromatic subject of red, green, or blue against a black background, the sharpness of the subject color is greater than the predetermined value Md in either one of the images generated from rays passing through the first and second optical regions D1 and D2. As a result of this, an image with a high sharpness can be generated.

The description of the present embodiment only illustrates merging of regions of a color image that are on the optical axis. As for non-axial regions, a correction of chromatic aberration of magnification or a correction of distortion may be performed before generating a color image.

In the present embodiment, an image sharpness is evaluated to be high or low by comparing the absolute values of differences in luminance value, i.e., sharpness itself; otherwise, it may be conducted through comparison of contrast values, for example. Usually, an image with a higher contrast value has a higher sharpness. A contrast value can be determined from a ratio (Lmax/Lmin) between a highest luminance value Lmax and a lowest luminance value Lmin within a predetermined calculation block, for example. Sharpness is a difference between luminance values, whereas a contrast value is a ratio between luminance values. A contrast value may be determined from a ratio between a point of the highest luminance value and a point of the lowest luminance value; or, a contrast value may be determined from a ratio between an average value of several points of the greatest luminance values and an average value of several points of the smallest luminance values, for example. In this case, instead of the first and second sharpness detection sections C1 and C2 shown in FIG. 1, the calculation processing section C includes a first contrast detection section which calculates a ratio between luminance values that are generated by the pixels P1 and a second contrast detection section which calculates a ratio between luminance values that are generated by the pixels P2.

Moreover, the optical system of the imaging apparatus as indicated in Table 1 and Table 2 is an image-side telecentric optical system. As a result of this, even if the angle of view changes, the principal ray enters the array optical device K at an incident angle with a value which is closer to 0 degrees, so that crosstalk between the light beam reaching the pixel P1 and the light beam reaching the pixel P2 can be reduced across the entire imaging region.

In the present embodiment, the subject-side surface of the optical device L1 of the optical device L1 is planar and spherical, respectively, in the first and second optical regions D1 and D2. However, these may be spherical surfaces with mutually different optical powers, or non-spherical surfaces with mutually different optical powers.

Embodiment 2

Figure 12:
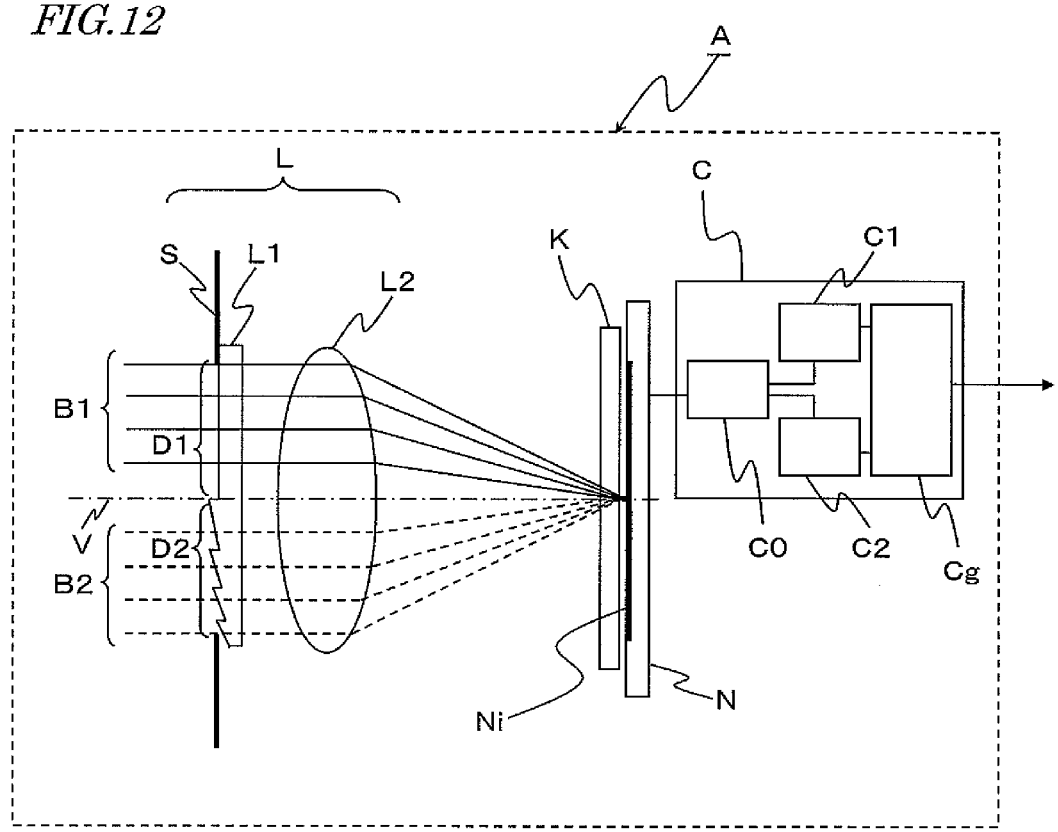
FIG. 12 A schematic diagram showing a second embodiment of an imaging apparatus A according to the present invention.

FIG. 12 is a schematic diagram showing an imaging apparatus A according to Embodiment 2. The present Embodiment 2 differs from Embodiment 1 in that the second optical region D2 of the optical device L1 has the shape of a diffractive lens. In the present embodiment, any detailed description directed to similar substance to that of Embodiment 1 will be omitted.

Figure 13:
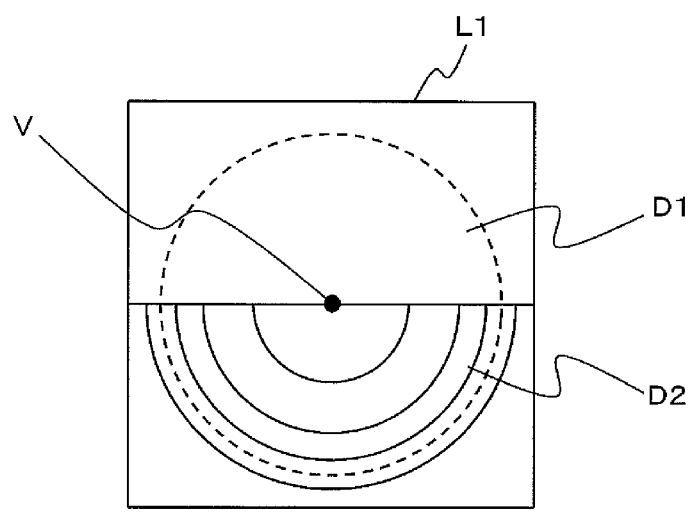
FIG. 13 A front view showing an optical device L1 according to Embodiment 2 of the present invention from the subject side.

FIG. 13 is a front view showing the optical device L1 from the subject side. The first and second optical regions D1 and D2 of the optical device L1 are two upper and lower portions divided so that the optical axis V is at a center of boundary therebetween. In FIG. 13, a broken line s shows where the stop S is.

Figure 14:
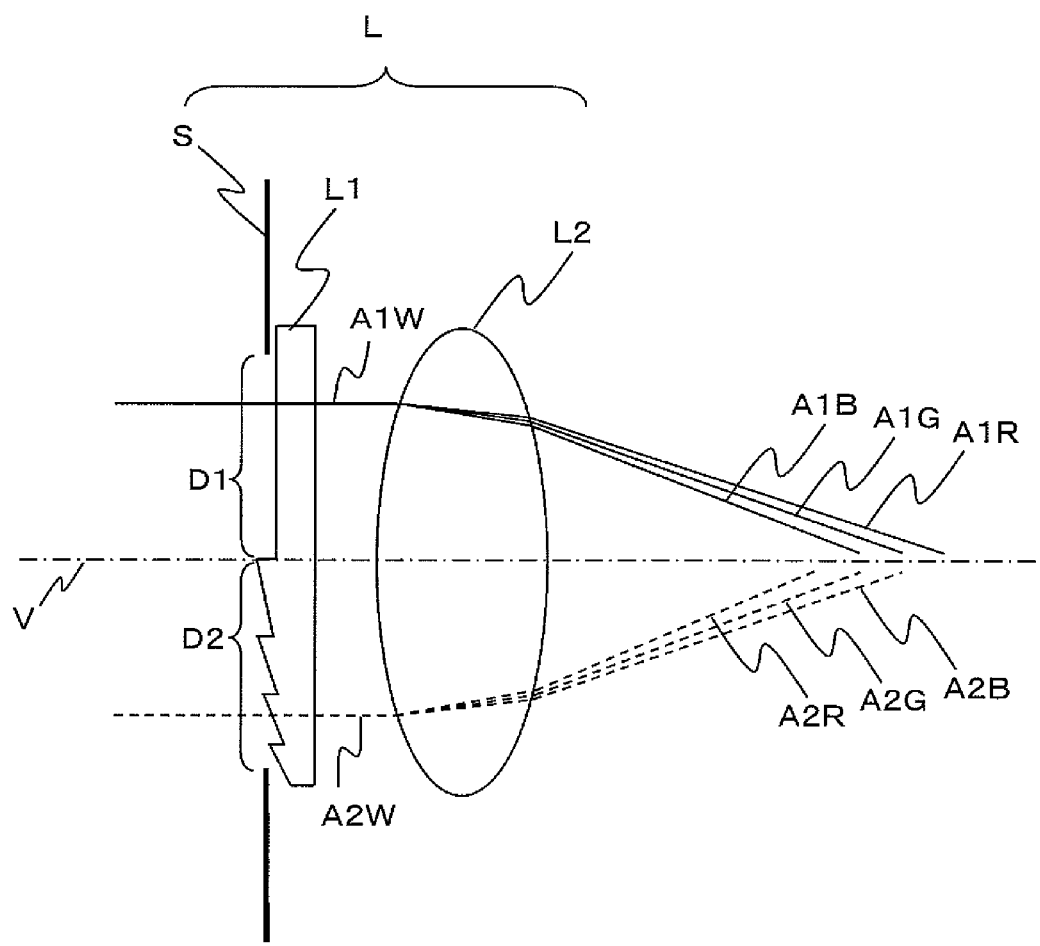
FIG. 14 A diagram showing rays of a first color, a second color, and a third color according to Embodiment 2 of the present invention.

FIG. 14 is a diagram schematically showing optical paths of a ray A1W and a ray A2W respectively having passed through the optical region D1 and the optical region D2.

When the ray A1W enters the lens L2 via the first optical region D1 of the optical device L1, due to axial chromatic aberration, rays gather in the order of blue (A1B), green (A1G), and red (A1R) toward an image surface on the optical axis of the lens L2.

On the other hand, when the ray A2W enters the lens L2 via the second optical region D2 of the optical device L1, due to axial chromatic aberration, rays gather in the order of red (A2R), green (A2G), and blue (A2B) toward the image surface on the optical axis of the lens L2. Due to the action of the diffractive lens, the second optical region D2 has an optical power resulting in an axial chromatic aberration which is inverted from that ascribable to the first optical region D1. Therefore, in the light passing through the second optical region D2, red and blue are converged in reversed order from the rays passing through the first optical region.

Figure 15:
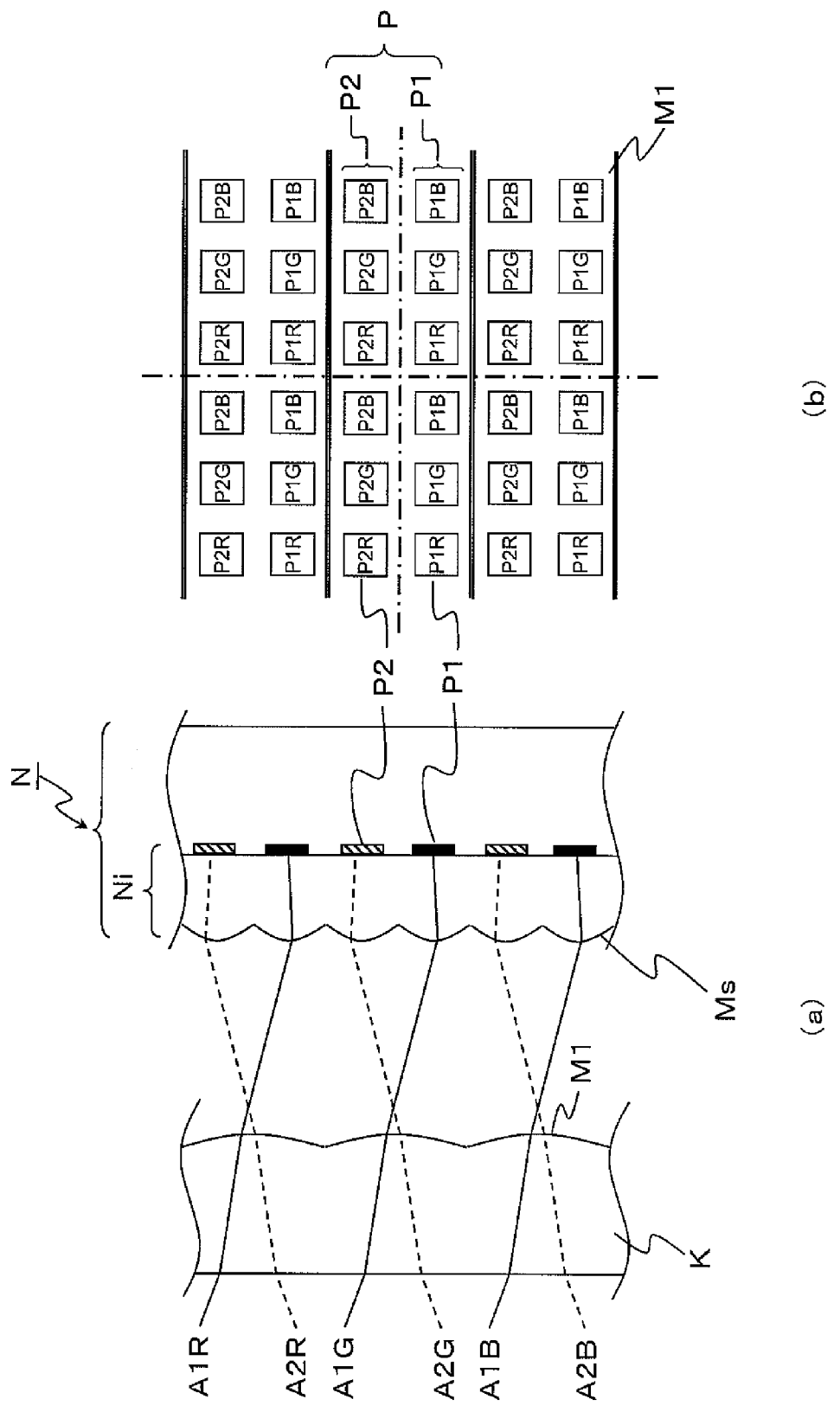
FIG. 15 (a) is a diagram showing enlarged the array optical device K and imaging device N shown in FIG. 11 according to the present Embodiment 2. (b) is a diagram showing relative positioning of the array optical device K and pixels of the imaging device N.

FIG. 15(a) is a diagram showing enlarged the array optical device K and imaging device N shown in FIG. 12; and FIG. 15(b) is a diagram showing relative positioning of the array optical device K and pixels on the imaging device N. The P1, P2 pixel construction and the action of the array optical device K are the same as in Embodiment 1.

In the present Embodiment 2, a first color image and a second color image are generated in a similar manner to Embodiment 1, and an image having the higher sharpness (or contrast) for each color is selected for each respective image region to generate an output image.

Next, a specific method of deepening the depth of field will be described. A cross-sectional view of the imaging apparatus A of the present Embodiment 2 is similar to FIG. 8, except that the portion of the subject-side surface of the optical device L1 that is located in the second optical region D2 is a diffractive lens shape.

Table 3, Table 4, and Table 5 show design data for the optical system of the imaging apparatus A. In Table 3 and Table 4, the respective symbols are identical to those in Table 1 and Table 2.

In Table 5, a phase difference function φ(h) on the diffraction plane (L1-R1 face) is expressed by (math. 2) in units of radians, where h is a height from the optical axis; and Bn(n=2, 4, 6) is a coefficient of an $n^{th}$ phase function.

$$\phi(h)=B_2h^2+B_4h^4+B_6h^6 \quad [\text{math. 2}]$$

TABLE 3

Lens data
Focal length = 10 mm, F value = 2.8
Angle of view 2ω = 10°
Effective imaging circle diameter = φ1.78 mm

| Surface number | Ri | | di | nd | νd |
|---|---|---|---|---|---|
| Object | ∞ | | 4000 | — | — |
| Stop | ∞ | | 0 | — | — |
| L1-R2 | Rregion D1 | ∞ | 0.5 | 1.5253 | 56.0 |
| | Rregion D2 | −132 | | | |
| L1-R2 | ∞ | | 8 | | |
| L2A-R1 | 7.375177 | | 5 | 1.5253 | 56.0 |
| L2A-R2 | −4 | | 0.45 | — | — |
| L2B-R1 | −4.194611 | | 3 | 1.585 | 29 |
| L2B-R2 | −13.548 | | 5.5 | — | — |
| Image surface | ∞ | | — | — | — |

TABLE 4

Aspheric coefficient

| | k | A4 | A6 | A8 |
|---|---|---|---|---|
| L2A-R1 | −0.296987 | −0.001152745 | −0.0000844121 | −0.0000089033 |
| L2A-R2 | 0 | −0.001758404 | 0.000448016 | 0.0000017356 |
| L2B-R1 | 0 | −0.000853458 | 0.000389826 | 0.000073819 |
| L2B-R2 | 0 | 0.00199215 | −0.0000950161 | 0.0000608074 |

TABLE 5

Phase function coefficient

| surface number | | B2 | B4 | B6 |
|---|---|---|---|---|
| L1-R1 | Region D2 | 24 | 0 | 0 |

In this design example, a portion of the subject-side face of the optical device L1 that is located in the first optical region D1 is a plane, and a portion that is located in the second optical region D2 is an optical surface obtained by adding a diffractive shape onto a spherical lens with a radius of curvature −132 mm. With this construction, rays passing through each optical region converge in an inverted order with respect to colors, as described above.

FIG. 16 shows through-focus MTF characteristics, on the optical axis, of rays passing through the first optical region D1 and the second optical region D2 in the lens optical system L (simulation results). The graph of FIG. 16(a) shows through-focus MTF characteristics associated with rays passing through the first optical region D1, whereas the graph of FIG. 16(b) shows through-focus MTF characteristics associated with rays passing through the second optical region D2. In FIG. 16, the through-focus MTF characteristics of each graph are calculated with respect to a case where a stop with a semicircular shape is used, as in FIG. 9.

Figure 17:
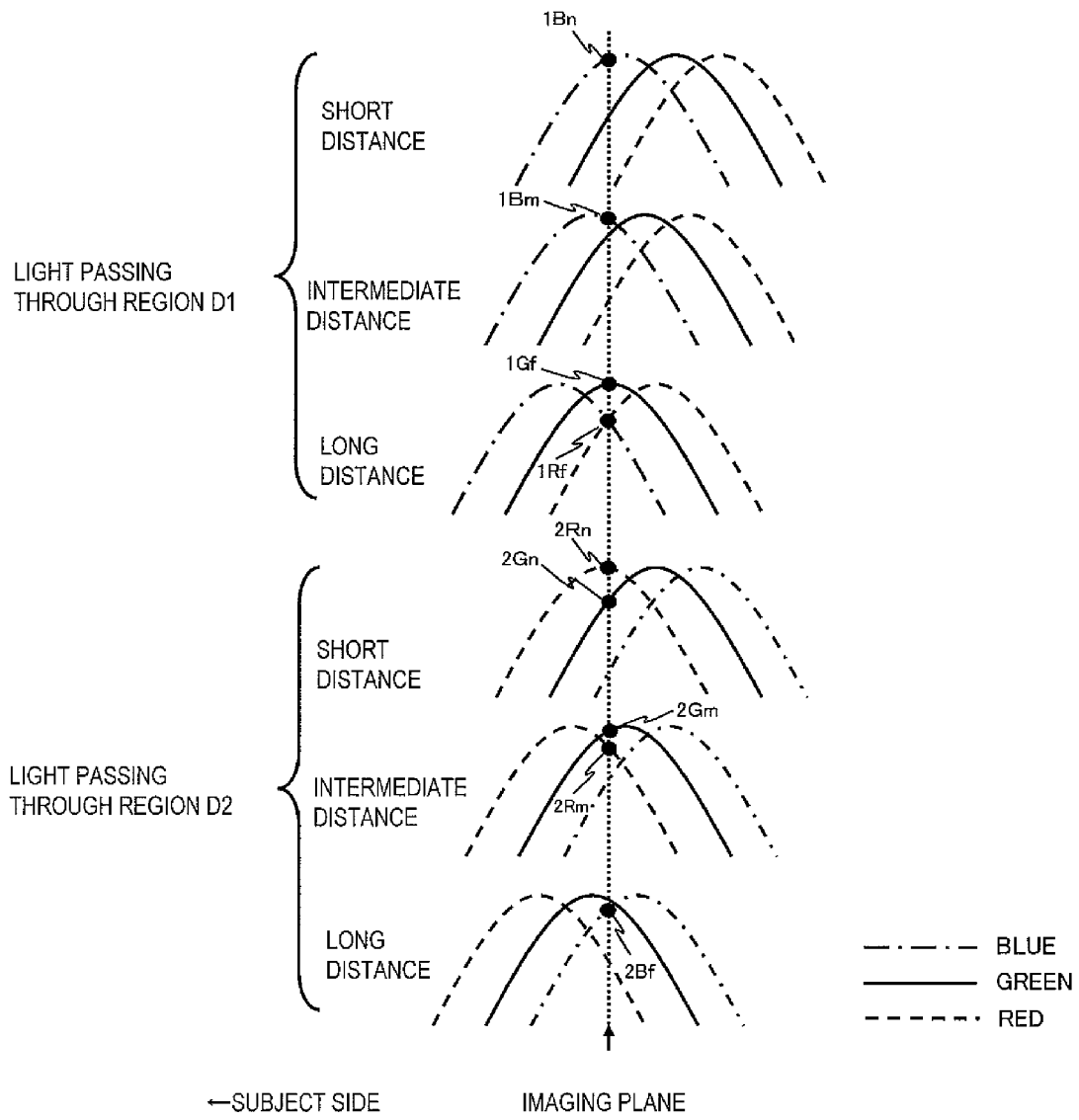
FIG. 17 A diagram schematically showing through-focus MTF characteristics of rays passing through the first optical region D1 and through-focus MTF characteristics of rays passing through the second optical region D2 according to Embodiment 2 of the present invention, with respect to different subject distances.

FIG. 17 is a diagram schematically showing through-focus MTF characteristics associated with rays passing through the first optical region and through-focus MTF characteristics associated with rays passing through the second optical region, with respect to different subject distances. Note that sharpness increases as an MTF on the imaging plane increases. In FIG. 17, only the through-focus MTF characteristics in the sagittal direction, which have shallow depths in FIG. 16, are extracted for schematic illustration.

As in Embodiment 1, depending on how long the subject distance is, a difference in terms of the MTF value of each color may occur between an image into which rays passing through the first optical region D1 are converged and an image into which rays passing through the second optical region D2 are converged.

In the case where the subject distance is a short distance, as shown in FIG. 17, a blue 1Bn MTF value associated with rays passing through the first optical region D1 is greater than a blue MTF value associated with rays passing through the second optical region D2. On the other hand, a green 2Gn MTF value associated with rays passing through the second optical region D2 is greater than a green MTF value associated with rays passing through the first optical region D1. Moreover, a red 2Rn MTF value associated with rays passing through the second optical region D2 is greater than a red MTF value associated with rays passing through the first optical region D1. If the higher MTF value is to be selected for each color, the blue 1Bn MTF value associated with rays passing through the first optical region D1 and the green 2Gn MTF value and red 2Rn MTF value associated with rays passing through the second optical region D2 are selected.

By a similar method, in the case of an intermediate distance, a blue 1Bm MTF value associated with rays passing through the first optical region D1 and a red 2Rm MTF value and green 2Gm MTF value associated with rays passing through the second optical region D2 are selected. In the case of a long distance, a green 1Gf MTF value and a red 1Rf MTF value associated with rays passing through the first optical region D1 and a blue 2Bf MTF value associated with rays passing through the second optical region D2 are selected.

Thereafter, in a similar manner to Embodiment I, the sharpnesses of the pixels P1 and the pixels P2 are actually calculated by the first and second sharpness detection sections C1 and C2 in the calculation processing section C.

Figure 18:
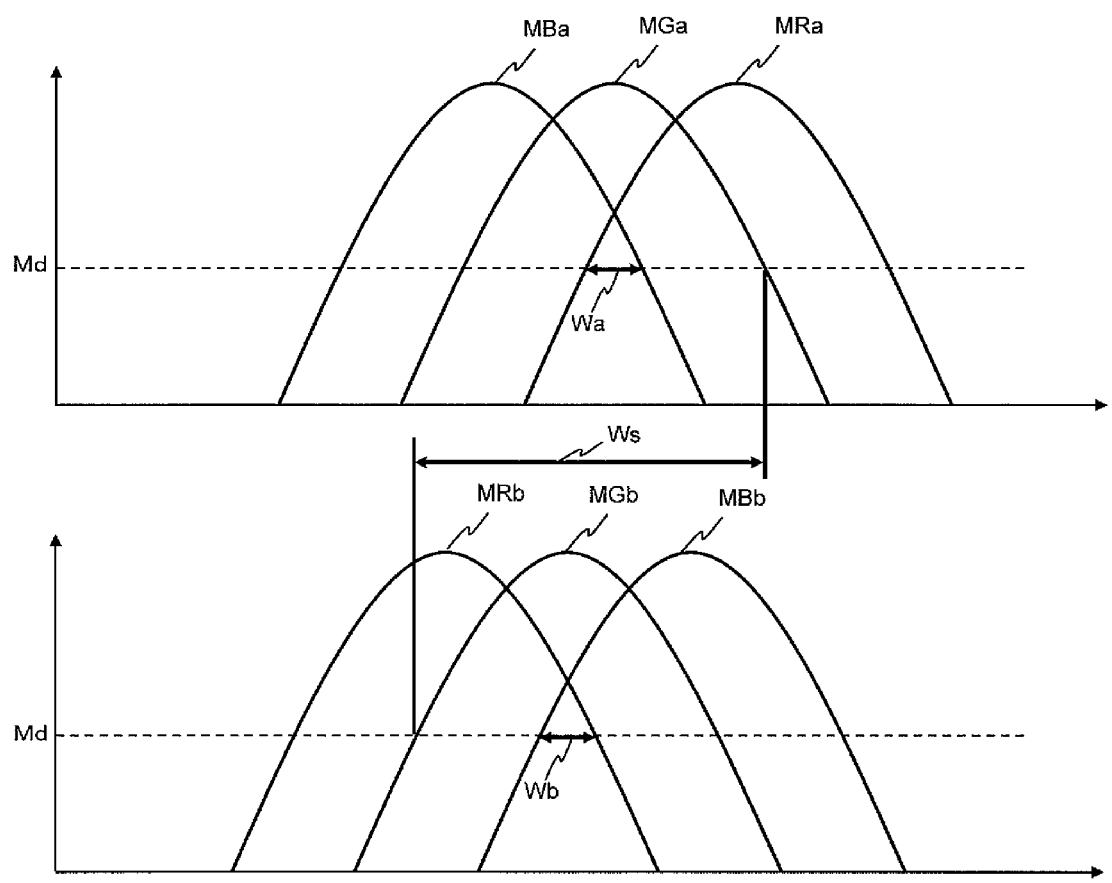
FIG. 18 A diagram schematically showing through-focus MTF characteristics of rays passing through the first optical region D1 and through-focus MTF characteristics of rays passing through the second optical region D2 according to Embodiment 2 of the present invention.

Next, the range of axial chromatic aberration of rays passing through the first optical region D1 and the second optical region D2 will be discussed. The upper graph of FIG. 18 shows through-focus MTF characteristics (sagittal direction) of the first optical region D1, whereas the lower graph of FIG. 18 shows through-focus MTF characteristics (sagittal direction) of the second optical region D2. In FIG. 18, the vertical axis represents MTF values of red, green, and blue at a predetermined spatial frequency, and the horizontal axis represents positions on the optical axis.

In FIG. 18, curves MBa, MGa, and MRa respectively represent MTF characteristics of blue, green, and red. The curves MBa, MGa, and MRa overlap one another. Curves MRb, MGb, and MBb respectively represent MTF characteristics of red, green, and blue. The curves MRb, MGb, and MBb overlap one another. The predetermined value Md is the aforementioned "boundary value", such that any MTF value that is equal to or greater than this value essentially falls within the depth of focus.

As in Embodiment 1, in a range Ws shown in FIG. 18, either the MTFs associated with rays passing through the first optical region D1 or the MTFs associated with rays passing through the second optical region D2 are equal to or greater than the predetermined value Md.

Since a sharpness which is calculated from the image generated from rays passing through the first optical region D1 and a sharpness which is calculated from the image generated from rays passing through the second optical region D2 are both derived, and the image with the higher sharpness is selected for each color to generate an output image, the range Ws in FIG. 18 essentially defines the depth of focus.

According to the present embodiment, between a microregion of the first color image generated from rays passing through the first optical region D1 and a microregion of the second color image generated from rays passing through the second optical region D2, an image component of the higher sharpness for each color is used to generate an output image, thus enhancing the sharpness of the output image through a simple technique, similarly to Embodiment 1. Moreover, as shown in FIG. 18, irrespective of where in the range Ws the imaging plane happens to be positioned, it is ensured that the sharpnesses for all of the three colors are greater than the predetermined value Md. Therefore, the depth of focus can be made much greater than conventional, whereby a sufficiently large depth of field can be obtained. Furthermore, according to the present embodiment, without using any means for detecting a focusing state or any adjustment means, images of subjects at a greater variety of subject distances can be captured.

In the present embodiment, when imaging a monochromatic subject of red, green, or blue against a black background, the sharpness of the subject color is greater than the predetermined value Md in either one of the images generated from rays passing through the first and second optical regions D1 and D2. As a result of this, an image with a high sharpness can be generated.

Embodiment 3

The present Embodiment 3 differs from Embodiment 2 in that an optical adjustment layer O is provided in the second optical region D2 of the optical device L1, the second optical region D2 having the shape of a diffraction grating.

Figure 19:
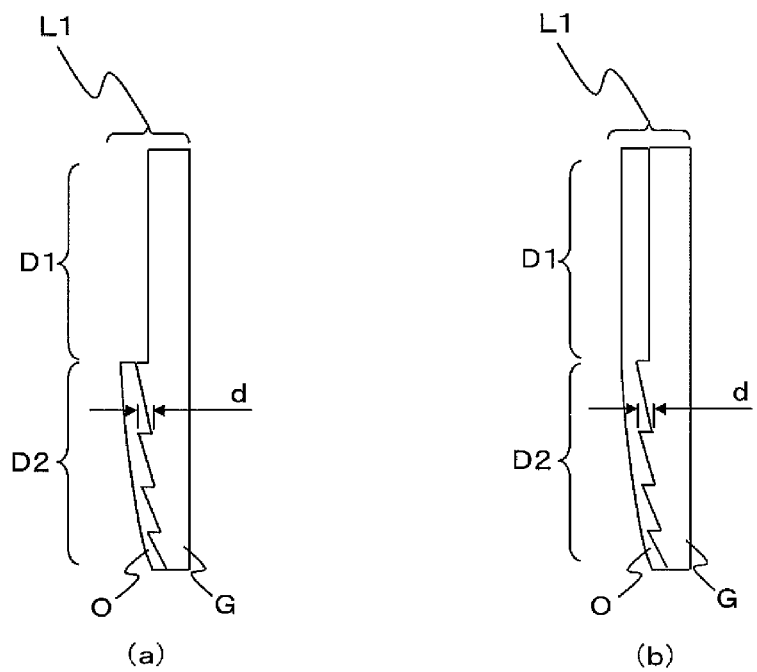
FIG. 19 (a) is a cross-sectional view showing an optical adjustment layer which is provided on a diffraction plane of a second optical region D2 according to Embodiment 3 of the present invention. (b) is a cross-sectional view showing an optical adjustment layer which is provided on both of the plane of the first optical region D1 and the diffraction plane of the second optical region D2.

FIG. 19(a) is a cross-sectional view showing the optical adjustment layer provided on a diffraction plane of the second optical region D2. In the diffraction plane shape shown in FIG. 12 of Embodiment 2, 100% diffraction efficiency is attained only at specific wavelengths, while unwanted diffracted light occurs in other wavelength bands; as a result, the diffraction efficiency is lowered and thus the image quality is deteriorated. On the other hand, providing an optical adjustment layer as in the present embodiment makes it possible to maintain a high diffraction efficiency across a broad wavelength band. Specifically, a blaze height d in FIG. 19(a) can be expressed by eq. (3), using a wavelength λ, a refractive index n1 of a substrate G, and a refractive index n2 of the optical adjustment layer O, where n1 and n2 materials are selected such that d will remain constant despite changes in wavelength.

[math. 3]

$$d = \lambda/(n2 - n1) \qquad (3)$$

With such a construction, a high diffraction efficiency can be maintained across a broad wavelength band for rays passing through the second optical region D2, so that the image quality of the image generated by the pixels P2 can be enhanced over Embodiment 1. As a result, the image quality of the image generated by the calculation processing section can be improved.

For the optical adjustment layer O, a material having a higher refractive index and a greater Abbe number than those of the substrate of the optical device L1, or a material having a lower refractive index and a smaller Abbe number than those of the substrate of the optical device L1 can be used. By using such materials, it is possible to reduce the wavelength dependence of first-order diffraction efficiency. When the substrate of the optical device L1 is polycarbonate, a composite material obtained by dispersing zirconium oxide in resin may be used for the optical adjustment layer O, for example.

Although FIG. 19(a) shows an optical adjustment layer being provided only on the upper face of the plane diffraction plane shape of the second optical region D2, if such a construction is difficult to manufacture, an optical adjustment layer may be provide in both of the first and second optical regions D1 and D2 as shown in FIG. 19(b). With such a construction, an optical adjustment layer can be provided more simply than in the construction of FIG. 19(a).

Embodiment 4

Figure 20:
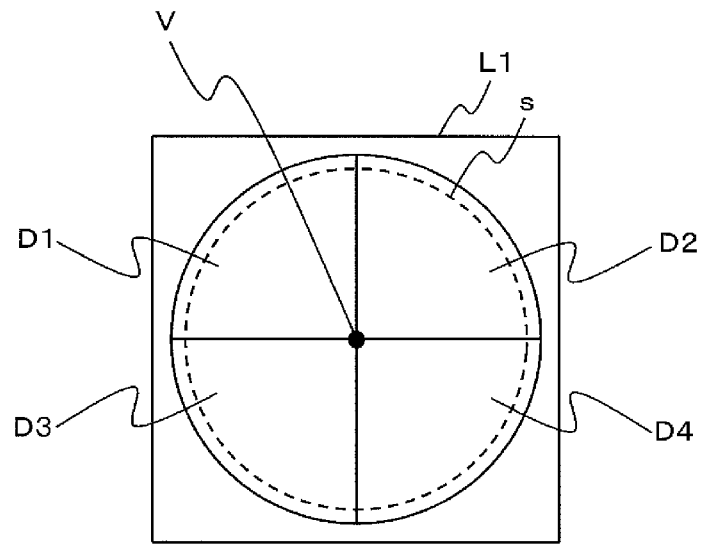
FIG. 20 A front view showing an optical device L1 according to Embodiment 4 of the present invention from the subject side.

The present Embodiment 4 differs from Embodiment I in that the optical device L1 is divided into four regions, and that the array optical device is changed from lenticular elements to microlenses. FIG. 20 is a front view showing the optical device L1 from the subject side. First to fourth optical regions D1 to D4 of the optical device L1 four upper-lower/right-left portions divided so that the optical axis V is at a center of boundary therebetween. The optical regions are spherical lenses with mutually different radii of curvature. In FIG. 20, a broken line s shows where the stop S is.

The third optical region D3 has a different optical power from those of the first and second optical regions D1 and D2. Specifically, the third optical region D3 is characterized so as to induce different converged positions of red, green, and blue light from the converged positions of the red, green, and blue light passing through the respective first and second optical regions D1 and D2.

Similarly, the fourth optical region D4 has a different optical power from those of the first, second, and third optical regions D1, D2, and D3. Specifically, the fourth optical region D4 is characterized so as to induce different converged positions of red, green, and blue light from the converged positions of the red, green, and blue light passing through the respective first, second, and third optical regions D1, D2, and D3.

Figure 21:
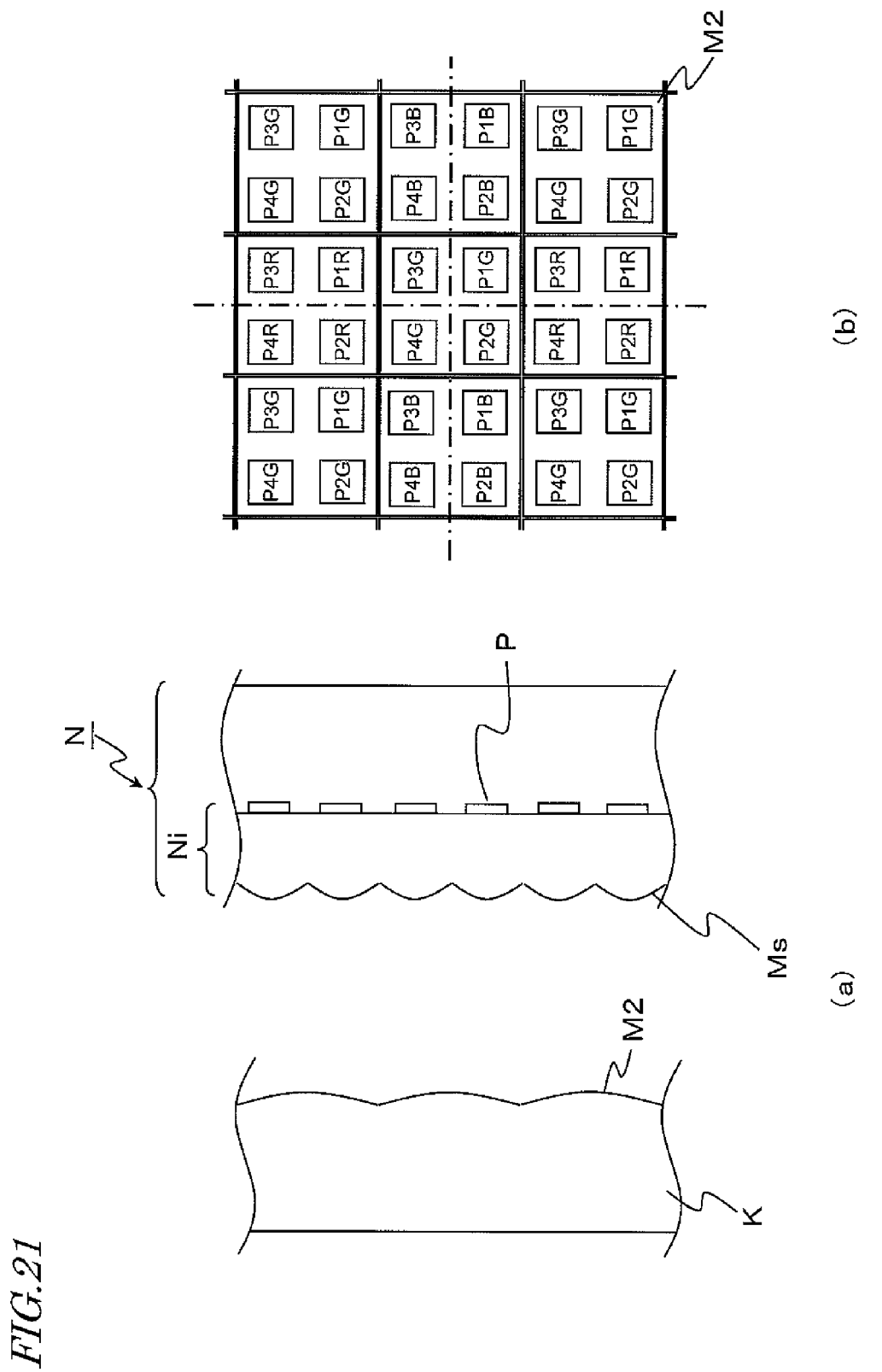
FIG. 21 (a) is a diagram showing enlarged the array optical device K and imaging device N shown in FIG. 1 according to the present Embodiment 4 of the present invention. (b) is a diagram showing relative positioning of the array optical device K and pixels of the imaging device N.

FIG. 21(a) is a diagram showing enlarged the array optical device K and the imaging device N; and FIG. 21(b) is a diagram showing relative positioning of the array optical device K and pixels on the imaging device N. As in Embodiment 1, the array optical device K is located near a focal point of the lens optical system L, and is located at a position which is a predetermined distance away from the imaging plane Ni. On the imaging plane Ni, pixels P1R, P2R, P3R, and P4R for detecting red light, pixels P1G, P2G, P3G, and P4G for detecting green light, and pixels P1B, P2B, P3B, and P4B for detecting blue light are provided. A filter which transmits red light is provided on the surface of the pixels P1R, P2R, P3R, and P4R for detecting red light; a filter which transmits green light is provided on the surface of the pixels P1G, P2G, P3G, and P4G for detecting green light; and a filter which transmits blue light is provided on the surface of the pixels P1B, P2B, P3B, and P4B for detecting blue light. Thus, since filters for transmitting light of different wavelength bands are provided on the surface of the pixels P, each pixel is able to mainly detect light of the color of R (red), G (green), or B (blue).

Moreover, microlenses Ms are provided so as to cover the surface of the pixels P1c to P4c (where c means R, G, or B).

Moreover, the array optical device K is disposed so that its face having optical elements M2 formed thereon faces toward the imaging plane Ni. The array optical device K is disposed so that one of its optical elements M2 would correspond to four pixels, i.e., two rows by two columns of pixels P1c to P4c (where c means R, G, or B), on the imaging plane Ni.

With such a construction, a large part of the light beam passing through the first to fourth optical regions D1 to D4 of the optical device L1 shown in FIG. 20 reach pixels P1c to P4c (where c means R, G, or B) of respective colors on the imaging plane Ni.

Figure 22:
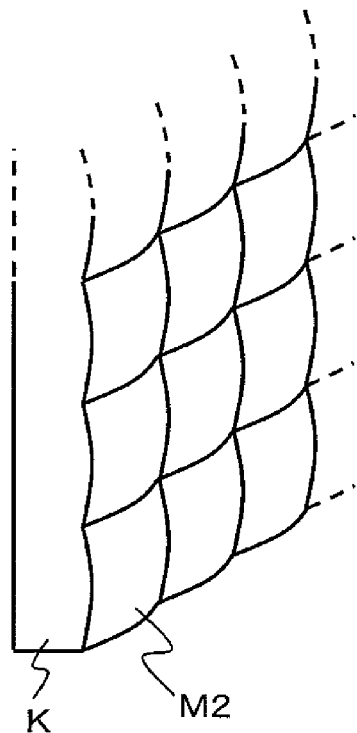
FIG. 22 A perspective view showing the array optical device K according to Embodiment 4 of the present invention.

FIG. 22 is a perspective view of the array optical device K. On a face of the array optical device K that is closer to the imaging device N, optical elements M2 are disposed in a lattice form. Each optical element M2 has circular-arc cross sections (cross sections respectively along the vertical direction and the lateral direction), each optical element M2 protruding toward the imaging device N. Thus, the optical elements M2 are microlenses, and the array optical device K is a microlens array.

As mentioned above, the first to fourth optical regions D1 to D4 of the optical device L1 are spherical lenses with mutually different radii of curvature. Therefore, the focal points are shifted into four positions for incidence upon the pixels P1c to P4c (where c means R, G, or B) of respective colors.

With the plurality of pixels P1c, P2c, P3c, and P4c (where c means R, G, or B), respectively, first, second, third, and fourth image information are obtained. The calculation processing section C (shown in FIG. 1 and the like) separates the image information obtained with the imaging device N into first, second, third, and fourth image information; and, as for any chromatic information that is missing in each pixel, a complementation process is performed in a similar manner to Embodiment 1 to generate first, second, third, and fourth color images. Furthermore, among the first, second, third, and fourth color images in a predetermined region, the calculation processing section C uses image components having the highest sharpness (or contrast) to generate an output image.

With such a construction, the depth of focus can be deepened relative to Embodiment 1 and Embodiment 2, and the depth of field can be further expanded.

Figure 23:
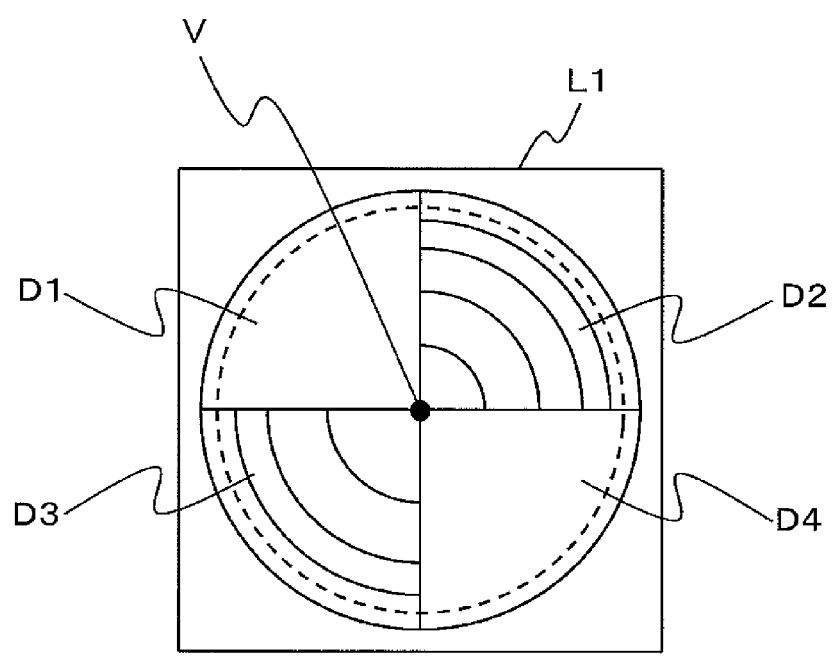
FIG. 23 A front view showing an optical device L1 according to a variant of Embodiment 4 of the present invention from the subject side.

Although the entire subject-side face of the optical device L1 is supposed to be spherical surfaces in the present Embodiment 4, a portion of the subject-side face of the optical device L1 that is located in at least one optical region may be a plane, or portions that are located in some optical regions may be non-spherical surfaces. Alternatively, the entire subject-side face of the optical device L1 may be a non-spherical surface. Moreover, as shown in FIG. 23, some optical regions may be diffractive shapes.

Embodiment 5

The present Embodiment 5 differs from Embodiments 1 and 4 in that a lenticular lens or a microlens array is formed on the imaging plane. In the present embodiment, any detailed description directed to similar substance to that of Embodiment 1 will be omitted.

FIGS. 24(a) and (b) are diagrams showing, enlarged, array optical devices K and imaging devices N. In the present embodiment, an array optical device K which is a lenticular lens (or a microlens array) is formed on an imaging plane Ni of an imaging device N. On the imaging plane Ni, pixels P are disposed in a matrix shape, as in Embodiment 1 and the like. One optical element of a lenticular lens, or a microlens corresponds to such plural pixels P. As in Embodiments 1 and 4, light beams passing through different regions of the optical device L1 can be led to different pixels according to the present embodiment. FIG. 24(b) is a diagram showing a variant of the present embodiment. With the construction shown in FIG. 24(b), microlenses Ms are formed on the imaging plane Ni so as to cover the pixels P, and an array optical device K is stacked on the surface of the microlenses Ms. The construction shown in FIG. 24(b) provides for an enhanced efficiency of convergence over the construction of FIG. 24(a).

In the case where the array optical device K is separated from the imaging device N as in Embodiment 1, it is difficult to establish alignment between the array optical device K and the imaging device N. On the other hand, forming the array optical device K on the imaging device N as in the present Embodiment 5 permits alignment through a wafer process. This facilitates alignment, whereby the accuracy of alignment can be improved.

Embodiment 6

The present Embodiment 6 differs from Embodiment 1 in that the first and second optical regions D1 and D2 are a plurality of regions separated so as to sandwich the optical axis, and that the array optical device K is changed from lenticular elements to microlenses. Herein, any detailed description directed to similar substance to that of Embodiment 1 will be omitted.

Figure 25:
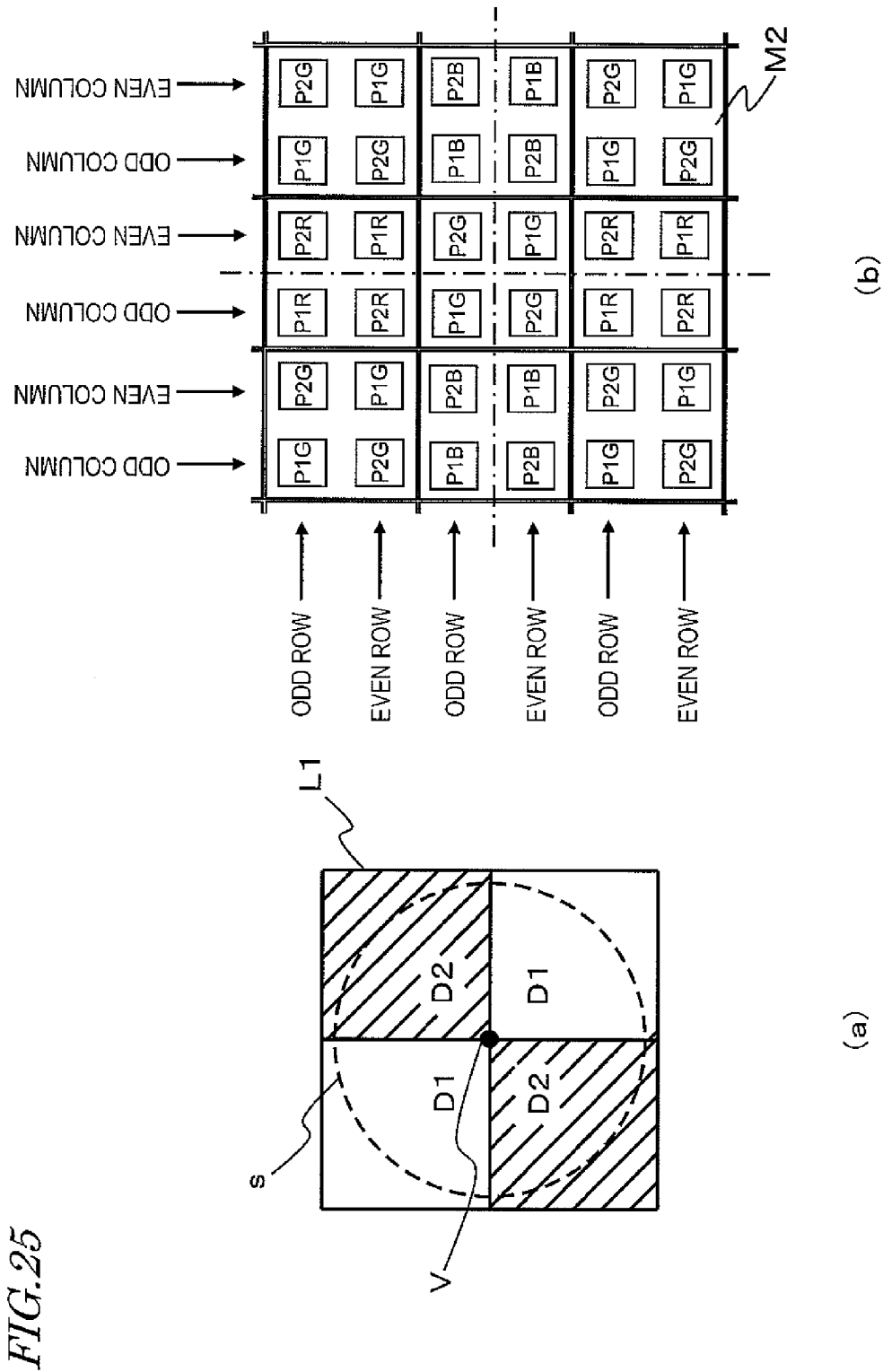
FIG. 25 (a) is a front view showing the optical device L1 from the subject side; and (b) is a diagram showing relative positioning of the array optical device K and pixels on the imaging device N.

FIG. 25(a) is a front view showing the optical device L1 from the subject side. In FIG. 25(a), the optical device L1 is divided into four rotation-symmetric regions (two first optical regions D1 and two second optical regions D2) around the optical axis V, in a plane which is perpendicular to the optical axis of the lens optical system. The first and second optical regions D1 and D2 are provided alternatingly, in such a manner that neither the two first optical regions D1 nor the two second optical regions D2 adjoin each other. The two first optical regions D1 are of a point-symmetric relationship with each other, around the optical axis as a center (point of tangency). Similarly, the two second optical regions D2 are of a point-symmetric relationship with each other, around the optical axis as a center (point of tangency).

FIG. 25(b) is a diagram showing relative positioning of the array optical device K and pixels on the imaging device N. In the present Embodiment 6, rays passing through the first optical region D1 reach pixels of odd rows and odd columns and pixels of even rows and even columns P1c (where c means R, G, or B). Therefore, luminance values which are obtained with pixels of odd rows and odd columns and luminance values obtained with pixels of even rows and even columns are used for generating a first color image. On the other hand, rays passing through the second optical region D2 reach pixels of even rows and odd columns and pixels of odd rows and even columns P2c (where c means R, G, or B), and therefore the luminance values of pixels of even rows and odd columns and the luminance values of pixels of odd rows and even columns are used for generating a second color image.

Next, effects obtained in the present embodiment will be discussed in comparison with the effects obtained in Embodiment 1.

In Embodiment 1, as shown in FIG. 2, the first optical region D1 and the second optical region D2 are semicircular regions obtained by dividing a circle into two in a plane which is perpendicular to the optical axis of the lens optical system. Therefore, the barycenter of a spot of light passing through each region on the image surface may vary depending on the subject distance, thus causing misalignment.

Figure 26:
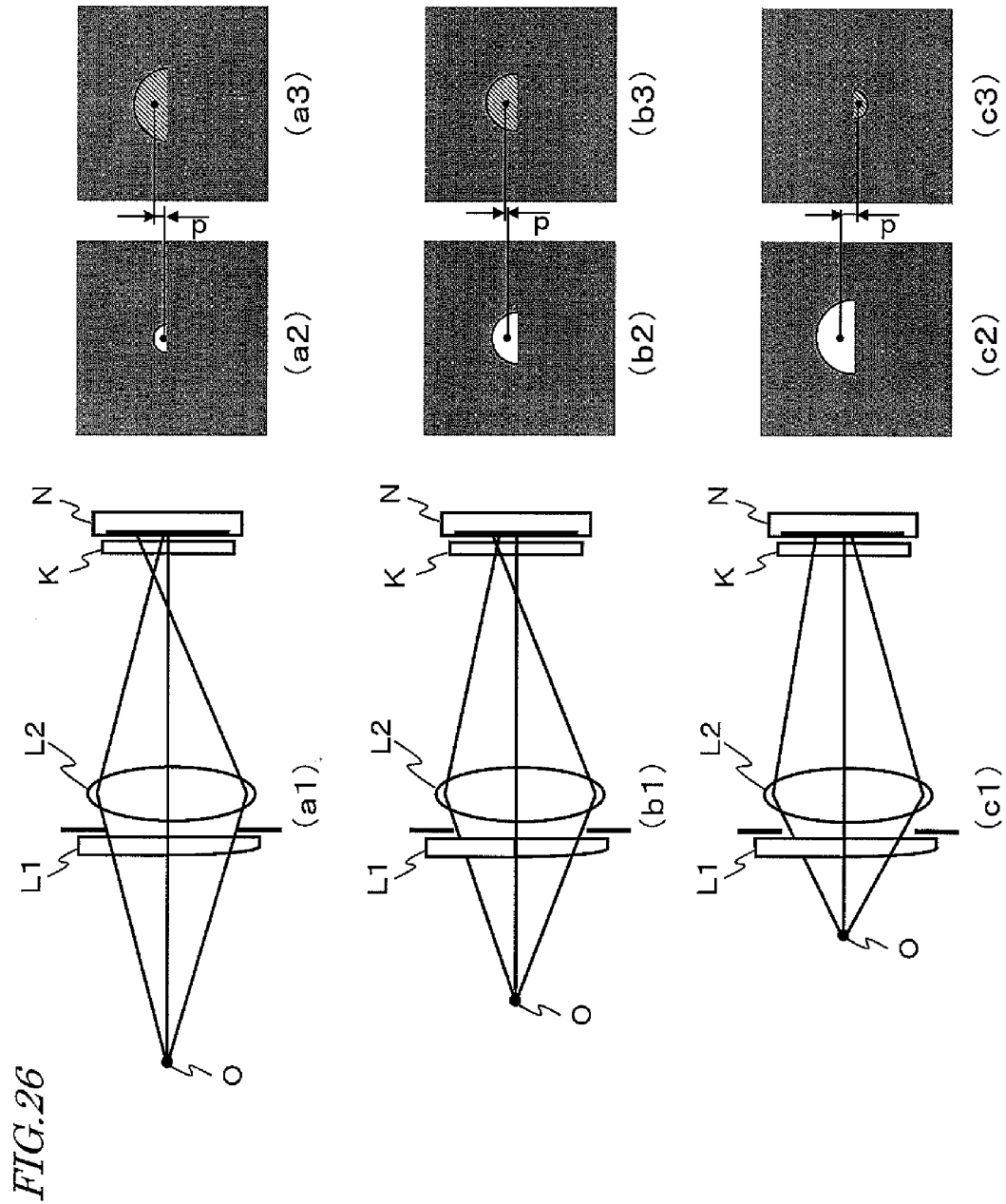
FIGS. 26 (a1), (b1), and (c1) show ray diagrams for different subject distances, where, in the construction of Embodiment 1, a portion of the subject-side face of the optical device L1 that is located in a first optical region D1 is a plane and a portion of the subject-side face of the optical device L1 that is located in a second optical region D2 is a spherical surface. (a2), (b2), and (c2) schematically show images of a point image which is obtained as light from an object point O passing through the first optical region D1 reaches pixels of odd columns via lenticular elements. (a3), (b3), and (c3) schematically show images which are obtained as light from an object point O passing through the second optical region D2 reaches pixels of even columns via lenticular elements.

FIG. 26 is ray diagrams for different subject distances and diagrams schematically illustrating point images and changes in their barycenters, where, in the construction of Embodiment 1, the subject-side face of the first optical region D1 of the optical device L1 is a plane and the subject-side face of the second optical region D2 of the optical device L1 is a spherical surface. In FIG. 26, (a1), (b1), and (c1) show ray diagrams with respect to different subject distances. In (a1), (b1), and (c1) of FIG. 26, an object point O is shown as the subject. Herein, description of any numerals in FIG. 1 which are similar to those in FIG. 26 will be omitted. In FIGS. 26, (a2), (b2), and (c2) are each an image containing a point image which is obtained as light from the object point O passing through the first optical region D1 reaches pixels of odd rows via the lenticular elements. In FIGS. 26, (a3), (b3), and (c3) are each an image containing a point image which is obtained as an image of the object point O passing through the second optical region D2 reaches pixels of even rows via the lenticular elements. In each image, the image of the object point O has a semicircular shape. In FIGS. 26, (a2), (a3), (b2), (b3), (c2), and (c3) show barycenters (black dots) of illuminance of the respective images.

Each image is schematically shown as a twofold expansion along the Y direction, obtained through a complementation process, of an image ((a2), (b2), (c2)) which is extracted for every odd row of pixels or an image ((a3), (b3), (c3)) which is extracted for every even row of pixels.

As shown in FIG. 26, the spot diameter changes with the position of the object point O (subject distance). Since images obtained by light respectively passing through the first and second optical regions D1 and D2 each have, a semicircular shape, the distance d between the barycenters of the respective point images of the image from pixels of odd rows and the image from pixels of even rows varies depending on the position of the object point. Presence of this distance d between the barycenters is undesirable, because it leads to a parallax (an error when calculating image sharpness (or contrast)).

On the other hand, according to the present Embodiment 6, the first and second optical regions D1 and D2 are disposed so as to be point-symmetric around the optical axis as a center, and therefore the distance d between the barycenters of the point images do not vary even if the subject distance changes.

FIG. 27 is a diagram schematically describing point images at different subject distances and changes in the barycenters thereof, according to the present embodiment. In FIGS. 27, (a1) and (a2), (b1) and (b2), and (c1) and (c2) show point images (indicated as semicircles) obtained by imaging an object point O through a microlens and the barycenters (black dots) thereof, respectively corresponding to the subject distances of the object point O shown in (a1), (b1), and (c1) of FIG. 27.

In FIG. 27, (a1), (b1), and (c1) are images each containing a point image obtained from pixels of odd rows and odd columns and pixels of even rows and even columns. In FIGS. 27, (a2), (b2), and (c2) are images each containing a point image obtained from pixels of even rows and odd columns and pixels of odd rows and even columns. As shown in FIG. 27, in the present Embodiment 6, each point image has the shape of opposing sectors of a circle, having a central angle of 90°, around the optical axis as a center. Therefore, the distance d between the barycenters of the respective point images in the image obtained from pixels of odd rows and odd columns and even rows and even columns and the image obtained from pixels of even rows and odd columns and odd rows and even columns is always zero, and does not change with the subject distance.

Thus, in the present Embodiment 6, by disposing the first and second optical regions D1 and D2 so as to be separated with the optical axis sandwiched therebetween, it is ensured that no parallax occurs in the acquired image even if the subject distance changes. As a result, shifts in the extracted position of the image due to parallax can be suppressed, whereby deteriorations in sharpness (or contrast) can be reduced.

Other Embodiments

Note that it suffices if the converged position of light passing through the first optical region D1 and the converged position of light passing through the second optical region D2 are different between at least two or more colors of light, without being limited to what is described in the aforementioned Embodiments. The difference(s) between the converged positions of two or more colors of light may be even smaller, or even greater.

Although the lens L2 is illustrated as being a single lens, it may be composed of a plurality of groups or a plurality of lenses.

Although the optical device L1 is disposed on the image surface side of the position of the stop, it may be on the subject side of the position of the stop.

Figure 28:
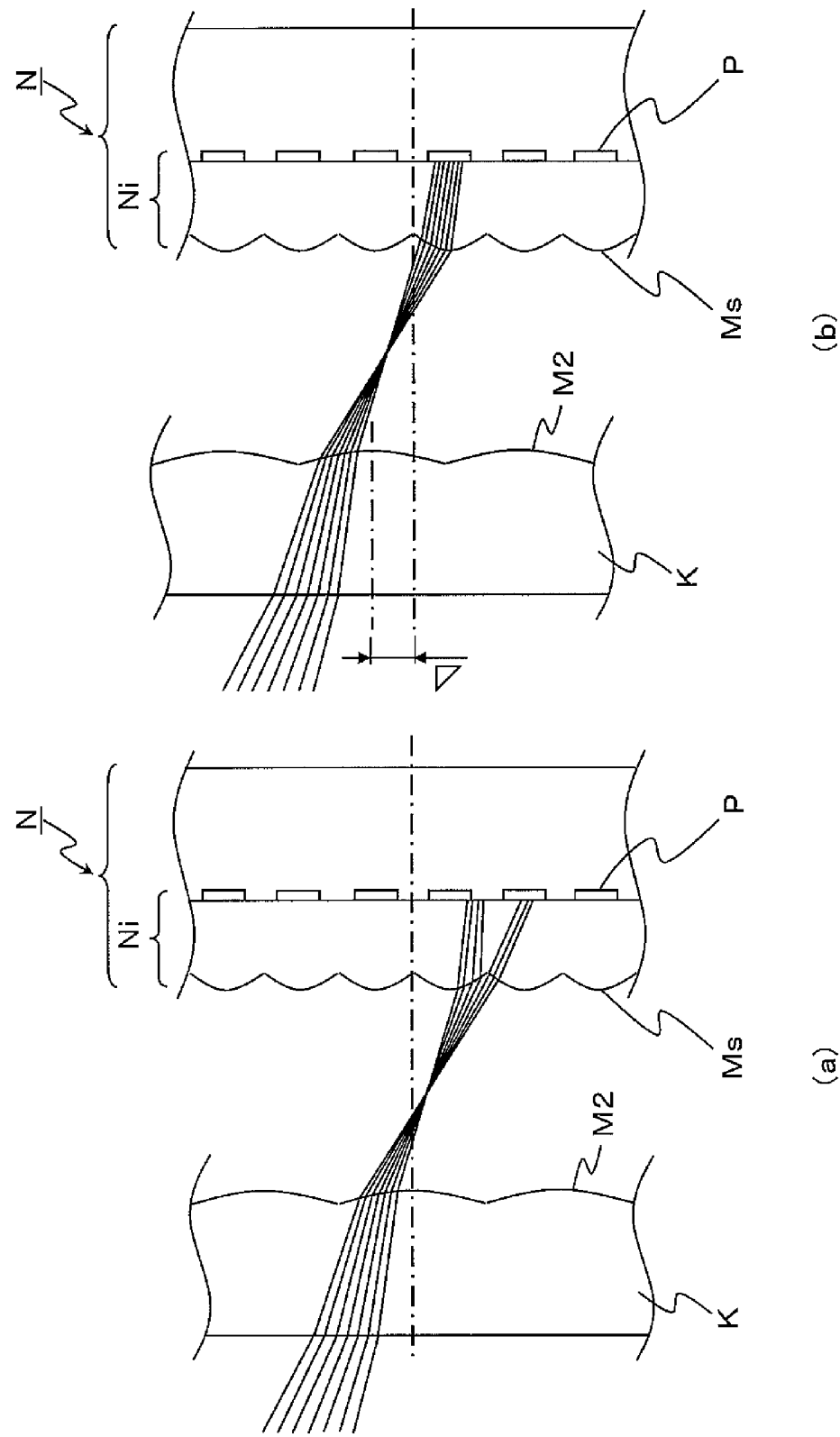
FIGS. 28 (a) and (b) are diagrams showing, enlarged, array optical devices K and imaging devices N according to other embodiments of the present invention.

Although the lens optical system L is illustrated as an image-side telecentric optical system in Embodiments 1 to 6 described above, it may be an image-side nontelecentric optical system. FIG. 28(a) is a diagram showing enlarged the neighborhood of an imaging section. FIG. 28(a) shows, within the light passing through the array optical device K, only a light beam which passes one optical region. As shown in FIG. 28(a), when the lens optical system L is a nontelecentric optical system, rays obliquely enter at peripheral portions of the imaging plane, and thus light leaking to adjoining pixels is likely to cause crosstalk. However, by allowing the array optical device to be offset by Δ from the pixel array as shown in FIG. 28(b), crosstalk can be reduced. Since the incident angle will vary depending on the image height, the offset amount Δ may be set in accordance with the incident angle of the light beam onto the imaging plane. Note that, in an image-side nontelecentric optical system, the incident angle of rays at the focal point of the optical system is unequivocally determined by the position of the rays passing through the stop S and the angle of view.

Figure 29:
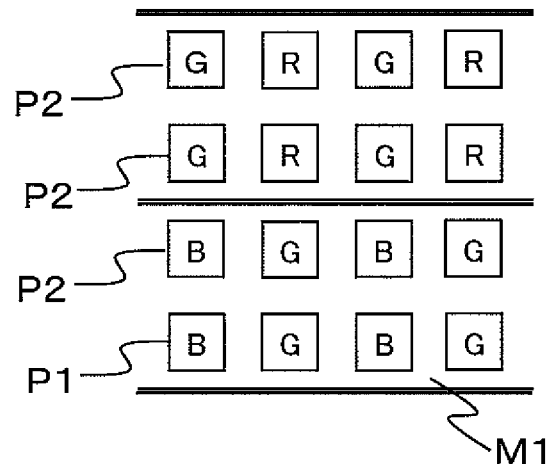
FIG. 29 A diagram showing relative positioning of an array optical device K and pixels on an imaging device N according to another embodiment of the present invention.

Moreover, in Embodiment 1 described above, pixels of the three colors of R (red), G (green), and B (blue) are in iterative arrays within a single optical element M1 of the lenticular lens. Alternatively, a construction as shown in FIG. 29 may be adopted, where iterative arrays of G (green), and R (red) pixels are within one optical element M1 of the lenticular lens, while iterative arrays of B (blue) and G (green) pixels are within another optical element M1 adjoining that optical element M1.

Figure 30:
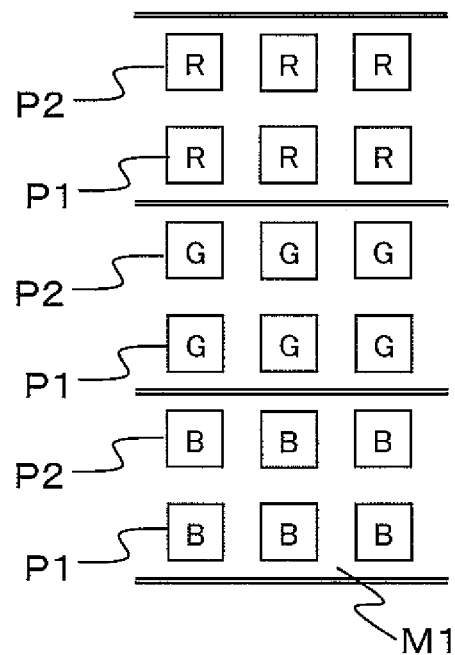
FIG. 30 A diagram showing relative positioning of an array optical device K and pixels on an imaging device N according to another embodiment of the present invention.

In Embodiment 1 described above, in each optical element M1 of the array optical device K, pixels of different colors are constituting iterative arrays. However, different optical elements M1 may be associated with pixels of different colors, such that each optical element M1 corresponds to one color of pixels. In the case where the optical elements are lenticular elements, as shown in FIG. 30, two rows of pixels P are disposed correspond to one optical element M1 of the lenticular lens which is the array optical device K. For example, pixels P1 are disposed in the upper row of the two rows of pixels P, whereas the pixels P2 are disposed in the lower row. The pixels P1 or P2 corresponding to one optical element. M1 of the lenticular lens may all be of the same color. The respective pixels P1 or P2 are in a different color for every optical element M1, and constitute iterative arrays.

Each optical element (microlens) of the microlens array according to the present Embodiments 2 to 6 may have a rotation-symmetric shape with respect to the optical axis. This will be discussed below in comparison with microlenses of a shape which is rotation-asymmetric with respect to the optical axis.

Figure 31:
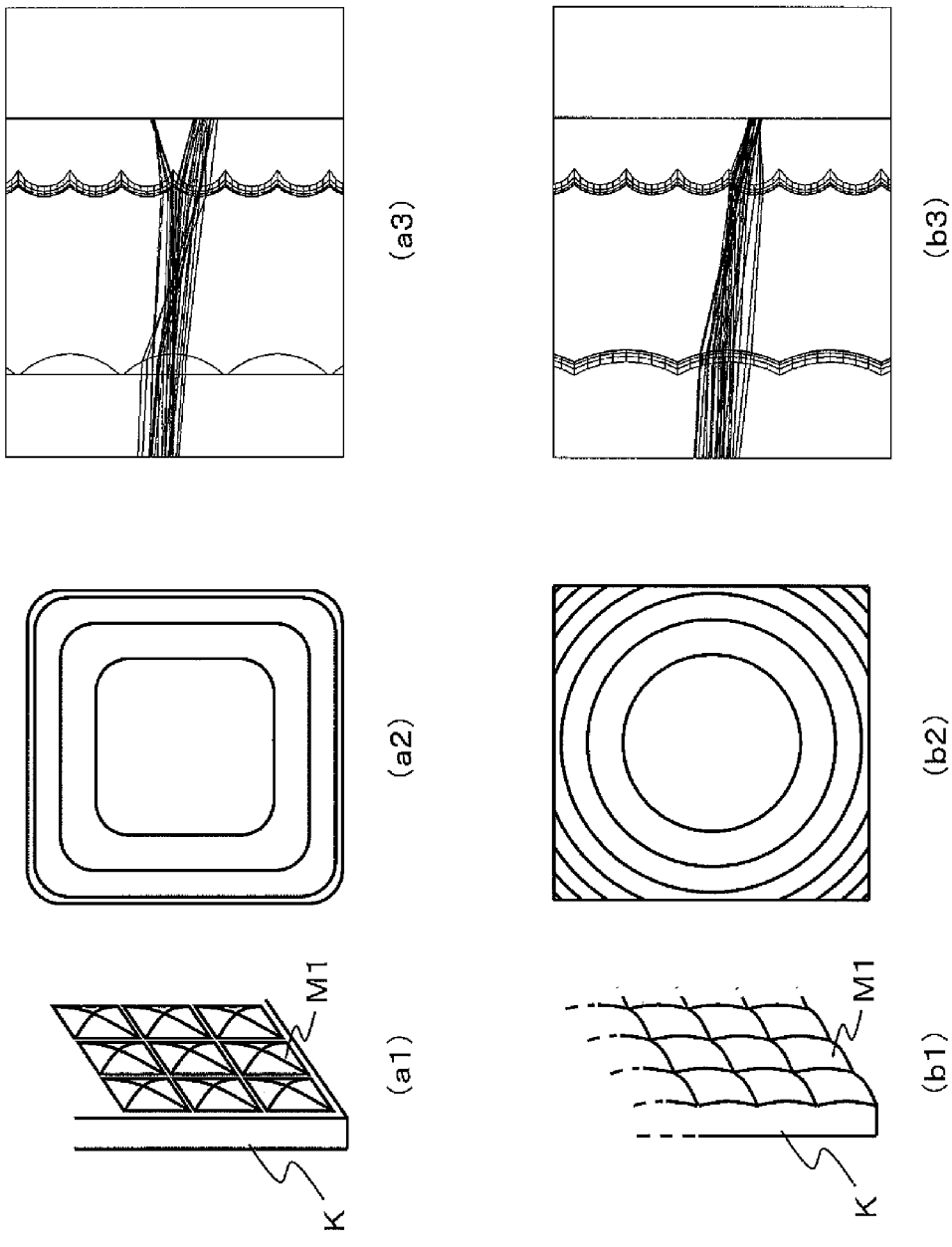
FIG. 31 (a1) is a perspective view showing a microlens array having a shape which is rotation-asymmetric with respect to the optical axis. (a2) is a diagram showing contours of the microlens array shown in (a1). (a3) is a diagram showing ray tracing simulation results where the microlenses shown in (a1) and (a2) are applied to an array optical device according to the present invention. (b1) is a perspective view showing a microlens array having a shape which is rotation-symmetric with respect to the optical axis. (b2) is a diagram showing contours of the microlens array shown in (b1). (b3) is a diagram showing ray tracing simulation results where the microlenses shown in (b1) and (b2) are applied to an array optical device according to an embodiment of the present invention.

FIG. 31(a1) is a perspective view showing a microlens array having a shape which is rotation-asymmetric with respect to the optical axis. Such a microlens array is formed by forming quadrangular prisms of resist on the array and rounding the corner portions of the resist through a heat treatment, and performing a patterning by using this resist. The contours of a microlens shown in FIG. 31(a1) are shown in FIG. 31(a2). In a microlens having a rotation-asymmetric shape, there is a difference in radius of curvature between the vertical and lateral directions (directions parallel to the four sides of the bottom face of each microlens) and oblique directions (diagonal direction of the bottom face of the microlens).

FIG. 31(a3) is a diagram showing ray tracing simulation results in the case where the microlenses shown in FIGS. 31(a1) and (a2) are applied to the array optical device according to the present invention. Although FIG. 31(a3) only shows a light beam which passes through only one optical region within the light passing through the array optical device K, a microlens of a rotation-asymmetric shape will allow light to leak to adjoining pixels, thus causing crosstalk.

FIG. 31(b1) is a perspective view showing a microlens array having a shape which is rotation-symmetric with respect to the optical axis. Microlenses of such a rotation-symmetric shape can be formed on a glass plate or the like by a thermal imprinting or UV imprinting manufacturing method.

FIG. 31(b2) shows contours of a microlens having a rotation-symmetric shape. In a microlens having a rotation-symmetric shape, the radius of curvature is identical between the vertical and lateral directions and oblique directions.

FIG. 31(b3) is a diagram showing ray tracing simulation results in the case where the microlenses shown in FIGS. 31(b1) and (b2) are applied to the array optical device according to the present invention. Although FIG. 31(b3) only shows a light beam which passes through only one optical region within the light passing through the array optical device K, it can be seen that no crosstalk such as that in FIG. 31(a3) is occurring. Thus, crosstalk can be reduced by adopting a rotation-symmetric shape for the microlenses, whereby an image with a higher sharpness (or contrast) can be obtained.

INDUSTRIAL APPLICABILITY

The imaging apparatus according to the present invention is useful for imaging apparatuses such as digital still cameras or digital camcorders. It is also applicable to security cameras, imaging apparatuses for monitoring the surroundings or monitoring people riding in an automobile, or imaging apparatuses for medical uses.

REFERENCE SIGNS LIST

A imaging apparatus
L lens optical system
L1 optical device
L2 lens
D1, D2, D3, D4 first, second, third, fourth optical regions
S stop
K array optical device
N imaging device
Ni imaging plane
M1 lenticular element (optical element) of array optical device
M2 microlens (optical element) of array optical device
P1, P2, P3, P4, P photodetectors on imaging device
C calculation processing section
O optical adjustment layer

The invention claimed is:

1. An imaging apparatus comprising:
a lens optical system having a first region in which a first color, a second color, and a third color of light pass through, and a second region in which the first color, second color, and third color of light pass through, the second region having an optical power for causing at least two or more colors of light to be converged at different positions from respective converged positions of the first color, second color, and third color of light passing through the first region;
an imaging device having a plurality of first pixels and a plurality of second pixels on which light from the lens optical system is incident;
an array optical device disposed between the lens optical system and the imaging device, the array optical device causing light passing through the first region to enter the plurality of first pixels, and causing light passing through the second region to enter the plurality of second pixels; and
a calculation processing section for generating an output image, wherein
the calculation processing section generates a first image of at least one color component among the first color, second color, and third color by using pixel values obtained at the plurality of first pixels, generates a second image containing the same color component as the at least one color component by using pixel values obtained at the plurality of second pixels, detects, for each color, an image component of a higher sharpness or contrast value between a predetermined region of the first image and a predetermined region of the second image, and generates the output image by using the detected image component for each color.

2. The imaging apparatus of claim 1, wherein,
among the first color, second color, and third color of light passing through the first region, the converged positions of at least two colors of light on an optical axis are mutually different; and
among the first color, second color, and third color of light passing through the second region, the converged positions of at least two colors of light on the optical axis are mutually different.

3. The imaging apparatus of claim 1, wherein at least one of the first region and the second region has a diffractive lens shape.

4. The imaging apparatus of claim 3, wherein an optical adjustment layer is formed on a surface of the diffractive lens shape.

5. The imaging apparatus of claim 1, wherein the first region and the second region are regions being divided around an optical axis of the lens optical system as a center of boundary.

6. The imaging apparatus of claim 1, wherein,
the first region has a plurality of first region subportions disposed so as to be point-symmetric with respect to an optical axis of the lens optical system; and
the second region has a plurality of second region subportions disposed so as to be point-symmetric with respect to the optical axis of the lens optical system.

7. The imaging apparatus of claim 1, wherein,
the lens optical system further includes at least a third region other than the first and second regions;
the third region has an optical power for causing at least two colors among the first color, second color, and third color to be converged at different positions from converged positions of the first color, second color, and third color of light passing through each of the first region and the second region;
the array optical device causes light passing through the third region to enter a plurality of third pixels other than the first and second pixels; and
the calculation processing section generates a third image containing the same color component as the at least one color component by using pixel values obtained at the plurality of third pixels, and generates the output image by using, for each color, an image component of a highest sharpness or contrast value among a predetermined region of the plurality of first images, a predetermined region of the second image, and a predetermined region of the third image.

8. The imaging apparatus of claim 1, wherein the lens optical system is an image-side telecentric optical system.

9. The imaging apparatus of claim 1, wherein,
the lens optical system is an image-side nontelecentric optical system; and
off an optical axis of the lens optical system, an array of the array optical device is offset from an array of the first pixels and second pixels of the imaging device.

10. The imaging apparatus of claim 1, wherein the array optical device is a lenticular lens or a microlens array.

11. The imaging apparatus of claim 1, wherein,
the array optical device is a microlens array;
the microlens array includes a plurality of optical elements;
each of the plurality of optical elements corresponds to at least one of the plurality of first pixels and to at least one of the second pixels; and
each of the plurality of optical elements has a shape which is rotation-symmetric with respect to an optical axis.

12. The imaging apparatus of claim 1, wherein the array optical device is formed on the imaging device.

13. The imaging apparatus of claim 12, further comprising a microlens provided between the array optical device and the imaging device, wherein
the array optical device is formed on the imaging device via the microlens.

14. The imaging apparatus of claim 1, wherein the plurality of first pixels and the plurality of second pixels respectively have filters for transmitting light of different wavelength bands.

15. The imaging apparatus of claim 1, wherein,
the array optical device has a plurality of optical elements;
each of the plurality of optical elements corresponds to at least one of the plurality of first pixels and to at least one of the second pixels; and
pixels respectively corresponding to of the plurality of optical elements have filters for transmitting light of a same wavelength region.

16. The imaging apparatus of claim 1, wherein,
the lens optical system further includes a stop; and
the first region and the second region are disposed near the stop.

17. An imaging system comprising:
an imaging apparatus including:
a lens optical system having a first region in which a first color, a second color, and a third color of light pass through, and a second region in which the first color, second color, and third color of light pass through, the second region having an optical power for causing at least two or more colors of light to be converged at different positions from respective converged positions of the first color, second color, and third color of light passing through the first region;
an imaging device having a plurality of first pixels and a plurality of second pixels on which light from the lens optical systemin incident; and
an array optical device disposed between the lens optical system and the imaging device, the array optical device causing light passing through the first region to enter the plurality of first pixels, and causing light passing through the second region to enter the plurality of second pixels; and
a calculation processing section for generating a first image of at least one color component among the first color, second color, and third color by using pixel values obtained at the plurality of first pixels, generates a second image containing the same color component as the at least one color component by using pixel values obtained at the plurality of second pixels, and generates the output image by using, for each color, an image component of a higher sharpness between a predetermined region of the first image and a predetermined region of the second image.

18. The imaging apparatus of claim 7, wherein,
the lens optical system further includes a fourth region other than first, second, and third region;
the fourth region has an optical power for causing at least two colors among the first color, second color, and third color to be converged at different positions from converged positions of the first color, second color, and third color of light passing through each of the first region, second region, and third region;
the array optical device causes light passing through the fourth region to enter a plurality of fourth pixels other than the plurality of first, second, and third pixels;
the array optical device includes a plurality of optical elements each corresponding to one pixel group, the pixel group being a two-row by two-column arrangement of one of the plurality of first pixels, one of the plurality of second pixels, one of the plurality of third pixels, and one of the plurality of fourth pixels;
filters for transmitting light of a same wavelength band are provided for the first pixel, second pixel, third pixel, and fourth pixel of the one pixel group to which each of the plurality of optical elements corresponds; and
the calculation processing section generates a fourth image containing the same color component as the at least one color component by using pixel values obtained at the plurality of fourth pixels, detects, for each color, an image component of a highest sharpness or contrast value among a predetermined region of the plurality of first images, a predetermined region of the second image, a predetermined region of the third image, and a predetermined region of the fourth image, and generates the output image by using the detected image component for each color.

* * * * *